(12) United States Patent
Yasukawa et al.

(10) Patent No.: US 11,381,954 B2
(45) Date of Patent: Jul. 5, 2022

(54) USER APPARATUS, BASE STATION, AND DIFFERENT FREQUENCY D2D MONITORING METHOD

(71) Applicant: NTT DOCOMO, INC., Tokyo (JP)

(72) Inventors: Shimpei Yasukawa, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 674 days.

(21) Appl. No.: 15/501,205

(22) PCT Filed: Aug. 5, 2015

(86) PCT No.: PCT/JP2015/072267
§ 371 (c)(1),
(2) Date: Feb. 2, 2017

(87) PCT Pub. No.: WO2016/021653
PCT Pub. Date: Feb. 11, 2016

(65) Prior Publication Data
US 2017/0230815 A1    Aug. 10, 2017

(30) Foreign Application Priority Data

Aug. 7, 2014  (JP) .............................. JP2014-161904
Apr. 9, 2015  (JP) .............................. JP2015-080417

(51) Int. Cl.
*H04W 8/00*    (2009.01)
*H04W 76/14*   (2018.01)
(Continued)

(52) U.S. Cl.
CPC ........... *H04W 8/005* (2013.01); *H04L 5/0048* (2013.01); *H04L 29/08306* (2013.01);
(Continued)

(58) Field of Classification Search
USPC ........................................... 370/332
See application file for complete search history.

(56) References Cited

U.S. PATENT DOCUMENTS 8,908,656 B2    12/2014  Sadek et al.
2008/0189970 A1  8/2008  Wang et al.
(Continued)

FOREIGN PATENT DOCUMENTS

CN    101682852 A    3/2010
JP    2014-504830 A   2/2014
WO    2013/181421 A2  12/2013

OTHER PUBLICATIONS

International Search Report issued in corresponding application No. PCT/JP2015/072267 dated Oct. 27, 2015 (2 pages).
(Continued)

*Primary Examiner* — Gregory B Sefcheck
*Assistant Examiner* — Majid Esmaeilian
(74) *Attorney, Agent, or Firm* — Osha Bergman Watanabe & Burton LLP

(57) ABSTRACT

A user apparatus for use in a mobile communication system that supports D2D communication, including: measurement gap control means configured to transmit a configuration request of a measurement gap for monitoring a different frequency D2D signal to a base station of a connecting or residing cell; and D2D communication means configured to monitor the different frequency D2D signal by using the measurement gap that is configured based on the configuration request.

7 Claims, 20 Drawing Sheets

(51) Int. Cl.
| | |
|---|---|
| *H04W 52/02* | (2009.01) |
| *H04W 24/10* | (2009.01) |
| *H04W 72/02* | (2009.01) |
| *H04W 16/32* | (2009.01) |
| *H04L 67/104* | (2022.01) |
| *H04W 72/04* | (2009.01) |
| *H04W 4/70* | (2018.01) |
| *H04L 5/00* | (2006.01) |
| *H04W 28/02* | (2009.01) |
| *H04W 48/10* | (2009.01) |
| *H04W 92/18* | (2009.01) |

(52) U.S. Cl.
CPC ............ *H04L 67/104* (2013.01); *H04W 4/70* (2018.02); *H04W 16/32* (2013.01); *H04W 24/10* (2013.01); *H04W 28/021* (2013.01); *H04W 48/10* (2013.01); *H04W 52/02* (2013.01); *H04W 72/02* (2013.01); *H04W 72/04* (2013.01); *H04W 72/0446* (2013.01); *H04W 76/14* (2018.02); *H04W 8/00* (2013.01); *H04W 92/18* (2013.01); *Y02D 30/70* (2020.08)

(56) References Cited

U.S. PATENT DOCUMENTS

| | | | |
|---|---|---|---|
| 2010/0208674 A1* | 8/2010 | Lee .................. | H04W 36/0088 370/329 |
| 2012/0178465 A1* | 7/2012 | Lin ...................... | H04W 24/10 455/450 |
| 2012/0188907 A1 | 7/2012 | Dayal et al. | |
| 2013/0059583 A1* | 3/2013 | Van Phan ............. | H04W 76/14 455/435.1 |
| 2014/0003262 A1* | 1/2014 | He ......................... | H04W 4/70 370/252 |
| 2014/0094188 A1* | 4/2014 | Kazmi .................. | H04W 4/023 455/456.1 |
| 2015/0055567 A1* | 2/2015 | Narasimha ........... | H04W 76/14 370/329 |
| 2015/0208262 A1* | 7/2015 | Siomina ................ | H04W 24/10 370/252 |
| 2015/0296490 A1* | 10/2015 | Yi ........................ | H04L 1/1812 370/329 |
| 2015/0312775 A1* | 10/2015 | Yi ......................... | H04W 76/28 370/254 |
| 2016/0219541 A1* | 7/2016 | Chatterjee ........... | H04W 74/004 |
| 2016/0295620 A1* | 10/2016 | Lindoff ................ | H04W 76/14 |
| 2016/0302051 A1* | 10/2016 | Lindoff ............. | H04W 72/0446 |
| 2017/0230938 A1* | 8/2017 | Huang .................. | H04W 72/02 |
| 2018/0167988 A1* | 6/2018 | Jung ..................... | H04W 72/04 |

OTHER PUBLICATIONS

Written Opinion of the International Searching Authority issued in corresponding application No. PCT/JP2015/072267 dated Oct. 27, 2015 (3 pages).
3GPP TR 36.843 V12.0.1, "3rd Generation Partnership Project; Technical Specification Group Radio Access Network; Study on LTE Device to Device Proximity Services; Radio Aspects (Release 12)"; Mar. 2014 (50 pages).
3GPP TS 36.321 V11.5.0, "3rd Generation Partnership Project; Technical Specification Group Radio Access Network; Evolved Universal Terrestrial Radio Access (E-UTRA); Medium Access Control (MAC) protocol specification (Release 11)"; Mar. 2014 (57 pages).
3GPP TS 36.331 V12.1.0, "3rd Generation Partnership Project; Technical Specification Group Radio Access Network; Evolved Universal Terrestrial Radio Access (E-UTRA); Radio Resource Control (RRC); Protocol specification (Release 12)"; Mar. 2014 (356 pages).
Office Action issued in the counterpart European Patent Application No. 15828940.5, dated May 15, 2018 (9 pages).
Office Action issued in the counterpart Japanese Patent Application No. 2016-540272, dated Sep. 12, 2017 (7 pages).
Ericsson; "Inter-Carrier and Inter-Cell Aspects of D2D Discovery and Communication"; 3GPP TSG RAN WG1 Meeting #76bis, R1-141386; Shenzhen, China, Mar. 31-Apr. 4, 2014 (5 pages).
Extended European Search Report issued in the counterpart European Patent Application No. 15828940.5, dated Jul. 4, 2017 (11 pages).
Kyocera; "Inter-frequency discovery considerations"; 3GPP TSG-RAN WG2 #86, R2-142240; Seoul, Republic of Korea, May 19-23, 2014 (10 pages).
Office Action in counterpart Chinese Patent Application No. 201580040802.8, dated Jun. 26, 2019 (16 pages).
Office Action issued in the counterpart Chinese Patent Application No. 201580040802.8, dated Mar. 4, 2020 (20 pages).

* cited by examiner

USER APPARATUS, BASE STATION, AND DIFFERENT FREQUENCY D2D MONITORING METHOD

TECHNICAL FIELD

The present invention relates to D2D communication (user apparatus-to-user apparatus communication). More particularly, the present invention relates to a technique for monitoring a D2D signal of a different frequency in D2D communication.

BACKGROUND ART

In current mobile communications such as LTE, it is common that a user apparatus UE and a base station eNB perform communication so that communication is performed between user apparatuses UE via the base station eNB and the like. However, in recent years, various techniques are proposed on D2D communication for performing direct communication between user apparatuses UE.

Especially, in D2D communication of LTE, there are proposed "Communication" for performing data communication such as push telephone call between user apparatuses UE, and "Discovery" in which a user apparatus UE transmits a discovery signal including ID of the user apparatus UE itself so as to cause a user apparatus UE of a receiving side to detect the user apparatus UE of the transmitting side (refer to non-patent document 1). Note that, it is assumed that "Communication" is applied to Public safety (police, fire radio), for example.

In the D2D communication specified in LTE, it is proposed that each user apparatus UE uses a part of uplink resources already specified as transmission resources of an uplink signal from the user apparatus UE to the base station eNB. Also, in assignment of resources used in D2D communication, it is proposed to assist it from the base station eNB.

RELATED ART DOCUMENT

Non Patent Document

[NON PATENT DOCUMENT 1] 3GPP TR 36.843 V12.0.1 (2014-03)
[NON PATENT DOCUMENT 2] 3GPP TS 36.321 V11.5.0 (2014-03)
[NON PATENT DOCUMENT 3] 3GPP TS 36.331 V12.1.0 (2014-03)

SUMMARY OF THE INVENTION

Problem to be Solved by the Invention

By the way, D2D communications using Bluetooth (registered trademark), WiFi (registered trademark) and the like have existed traditionally, and, in Discovery in these D2D communications, terminal detection that does not depend on operators is available. Also in D2D Discovery using an LTE network, it is desirable that user apparatus detection between user apparatuses of different operators (inter-operator D2D) is available.

As described before, in D2D communication of LTE, a part of cellular uplink resources is used. Therefore, the user apparatus UE performs transmission and reception of a D2D signal using a carrier (frequency band, more specifically, a predetermined frequency carrier in a band) of a connecting cell. However, since carriers to use are generally different between operators, in order for a user apparatus UE to receive a D2D signal from a user apparatus UE connected to a cell of another operator, it is necessary to switch to a carrier of the other operator so as to monitor a D2D signal by a frequency of the carrier. In addition to that, in the case where the D2D configuration (resource pool configuration and the like) of the other operator is unknown for the user apparatus UE, it is necessary to receive broadcast of the other operator.

That is, for example, as shown in FIG. 1, in a case where, in the operator A, a carrier A is used for D2D communication, and in the operator B, a carrier B is used for D2D communication, the user apparatus UE of the operator A needs to monitor a D2D signal by switching the carrier A to the carrier B in order to receive a D2D signal that the user apparatus UE of the operator B transmits. Similarly, the user apparatus UE of the operator B needs to monitor a D2D signal by switching the carrier B to the carrier A in order to receive a D2D signal that the user apparatus UE of the operator A transmits.

When the user apparatus UE is connected to or resides in a cell, monitoring associated with the carrier switching needs to be performed in a short period in order not to inhibit communication with the cell.

However, D2D communication of LTE is configured such that a usable resource (resource pool) of the cellular communication resources periodically arrives, but, generally, since the base station eNB does not ascertain arrival timing of a resource for D2D of the other operator, it's not always true that a time during which carrier switching is available matches arrival timing of the resource for D2D. Therefore, in the D2D signal monitoring by the short period carrier switching like the above-mentioned one, it can be considered that the D2D signal of the other operator cannot be detected or delay may occur for monitoring. On the other hand, by using a long period for monitoring, a D2D signal can be easily detected. However, it inhibits cellular communication of the connecting cell or D2D signal transmission and reception of the same frequency. Note that performing D2D signal monitoring by a frequency different from a frequency used in the own connecting or residing cell, like the other operator D2D signal monitoring, is referred to as different frequency D2D signal monitoring.

The present invention is contrived in view of the above-mentioned points, and an object is to provide a technique, in a mobile communication system, that enables a user apparatus to efficiently perform different frequency D2D signal monitoring without inhibiting cellular communication and same frequency D2D signal transmission and reception as much as possible.

Means for Solving the Problem

According to an embodiment of the present invention, there is provided a user apparatus for use in a mobile communication system that supports D2D communication, including:

measurement gap control means configured to transmit a configuration request of a measurement gap for monitoring a different frequency D2D signal to a base station of a connecting or residing cell; and D2D communication means configured to monitor the different frequency D2D signal by using the measurement gap that is configured based on the configuration request.

Also, according to an embodiment of the present invention, there is provided a base station for use in a mobile communication system that supports D2D communication, including:

reception means configured to receive, from a user apparatus, a configuration request of a measurement gap for monitoring a different frequency D2D signal that is transmitted by a frequency different from a frequency used for D2D signal transmission by the user apparatus; and measurement gap control means configured to configure a measurement gap for the user apparatus based on configuration information of the measurement gap included in the configuration request.

Also, according to an embodiment of the present invention, there is provided a different frequency D2D signal monitoring method performed by a user apparatus and a base station for use in a mobile communication system that supports D2D communication, including:

a step in which the user apparatus transmits a configuration request of a measurement gap for monitoring a different frequency D2D signal to the base station;

a step in which the base station transmits a response for the configuration request to the user apparatus; and a step in which the user apparatus monitors the different frequency D2D signal by using the measurement gap.

Effect of the Present Invention

According to an embodiment of the present invention, it becomes possible to provide a technique, in a mobile communication system, that enables a user apparatus to efficiently perform different frequency D2D signal monitoring without inhibiting cellular communication and same frequency D2D signal transmission and reception as much as possible.

EMBODIMENTS FOR CARRYING OUT THE INVENTION

In the following, an embodiment of the present invention is described with reference to figures. The embodiment described below is merely an example, and the embodiment to which the present invention is applied is not limited to the embodiment below. For example, although it is assumed that the mobile communication system of the present embodiment is a system of a scheme complying with LTE, the present invention is not limited to LTE, and other schemes can be applied. In the specification and the claims, the term "LTE" is used to widely mean not only a communication scheme corresponding to 3GPP release 8 or 9, but also a communication scheme corresponding to 3GPP release 10, 11, or 12 or later releases.

Also, the present invention can be applied to both of Discovery and Communication of D2D. Thus, in the following, signals used in Discovery and Communication are collectively referred to as a D2D signal. Also, the present invention can be applied not only to D2D communication between operators, but also to a case where different carriers are used between cells in the same operator, and the like.

(System Configuration)

Figure 1:
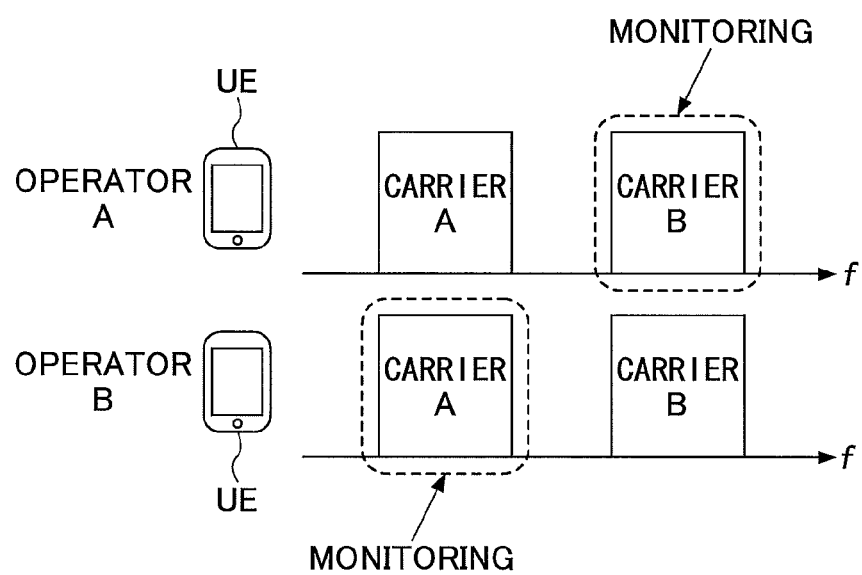
FIG. 1 is a diagram for explaining a problem in D2D communication between operators.
Figure 2:
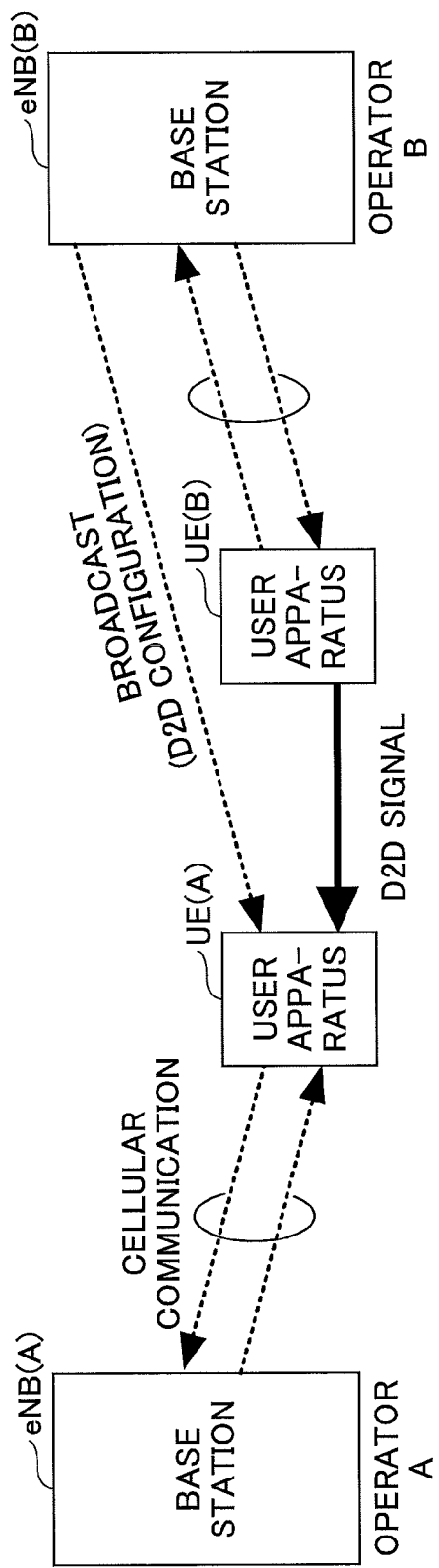
FIG. 2 is a block diagram of a communication system in an embodiment of the present invention.

FIG. 2 shows a configuration example of a communication system in an embodiment of the present invention. As shown in FIG. 2, in the communication system of the present embodiment, there are a base station eNB(A) of an operator A and a user apparatus UE(A) under it, and a base station eNB(B) of an operator B and a user apparatus UE(B) under it. Carriers for use in D2D communication are different between the operators A and B.

Each user apparatus UE includes a function configured to perform normal cellular communication and a D2D communication function. As shown in FIG. 2, in the present embodiment, the user apparatus UE(A) receives broadcast information from the base station eNB(B), so that the user apparatus UE(A) ascertains resource configuration information of D2D in the operator B, sets measurement gaps based on the resource configuration information, and performs reception (monitoring) of a D2D signal transmitted from the user apparatus UE(B) in a measurement gap. In the following, descriptions of "user apparatus UE" and "base station eNB" without indicating operators A or B indicate the user apparatus UE(A) and the base station eNB(A) functioning in the operator A side shown in FIG. 2 unless otherwise specified. Note that, in the present embodiment, "measurement gap" used for transmission or reception of a D2D signal may be referred to as "D2D gap".

(Basic Operation Example)

Figure 3:
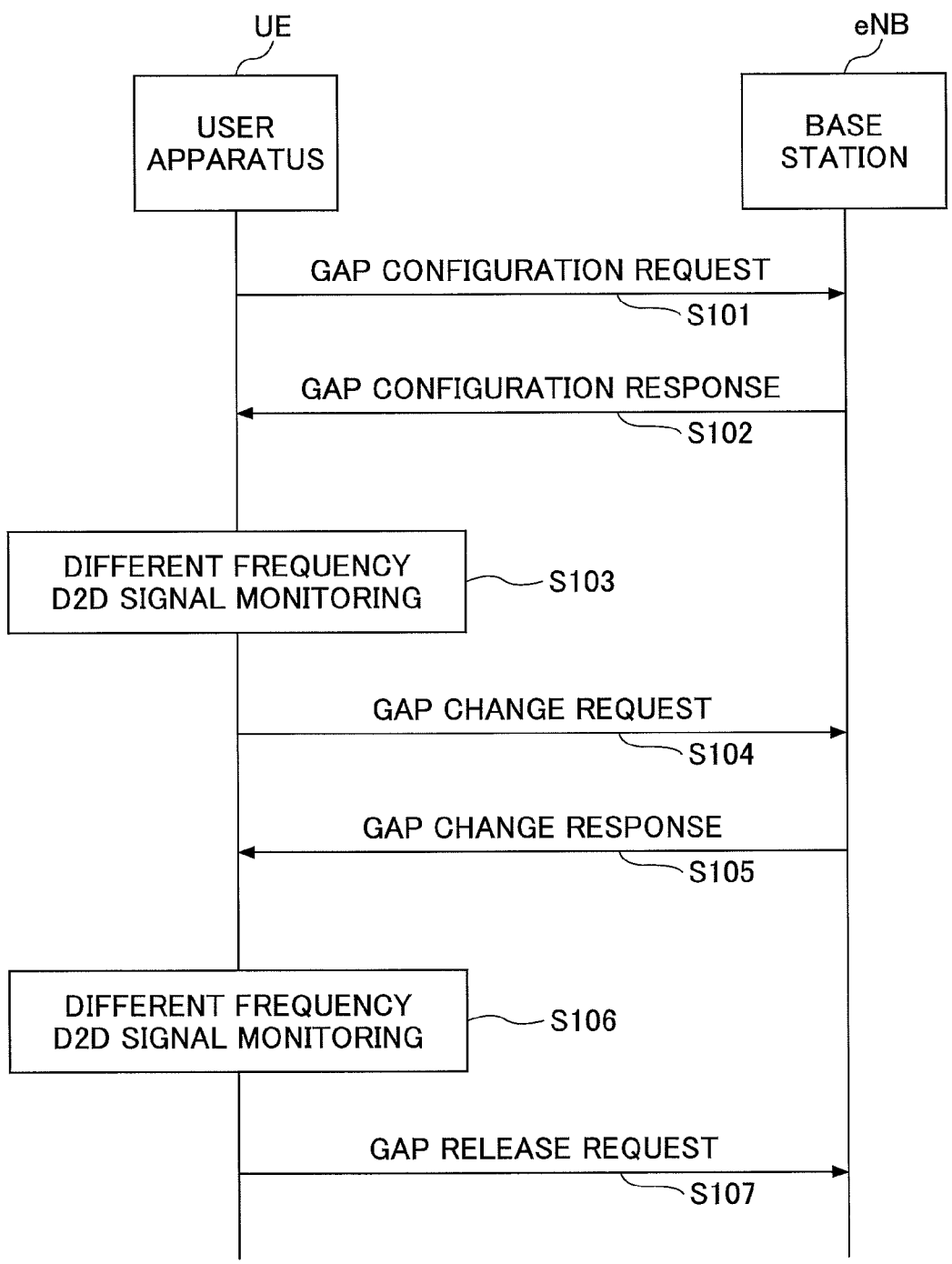
FIG. 3 is a sequence diagram showing a flow of basic processes between a user apparatus UE and a base station eNB.

A basic operation example in the user apparatus UE and the base station eNB in the present embodiment is described with reference to FIG. 3. In FIG. 3, the user apparatus UE is connected to or resides in a cell of the base station eNB.

As premises for FIG. 3, for example, it is assumed that the user apparatus UE ascertains a resource configuration of D2D communication of another operator by receiving broadcast information of the other operator from a base station of the other operator.

In step S101, the user apparatus UE transmits a gap configuration request to the base station eNB. This gap configuration request includes information (example: cycle, gap length and the like) for specifying measurement gaps to be configured in the user apparatus UE and the base station eNB. Or, a frequency that the user apparatus UE desires to receive or transmit may be included. When the base station eNB knows D2D resource configuration information of other frequencies beforehand, it is possible to configure proper gaps only by a simple request from the user apparatus UE. For that purpose, the base station eNB may notify the user apparatus UE of a list of frequencies for which the base station eNB knows D2D resource configuration information. As described later, the gap configuration request may include D2D resource configuration information (arrival cycle of resource pool, time length and the like) itself of another operator. The base station eNB configures measurement gaps for the user apparatus UE based on the gap configuration request, and returns a gap configuration response to the user apparatus UE (step S102). In the present example, the gap configuration response includes, for example, information indicating gap configuration is allowed, and it is not necessary to include cycle, length of the gap and the like related to the request from the user apparatus UE. Also, the gap configuration request may be transmitted by including it in a request/notification of D2D reception or D2D transmission.

The user apparatus UE that receives the gap configuration response configures measurement gaps by the content requested in step S101. This is merely an example, and the base station eNB may instruct, to the user apparatus UE, setting of measurement gaps different from the request in the gap configuration response.

"To configure measurement gaps" means to perform setting, in the base station eNB, such that the base station eNB does not transmit and receive a signal to/from the user apparatus UE (does not perform scheduling) during a predetermined period that periodically arrives, and to perform setting, in the user apparatus UE, such that the user apparatus UE does not transmit and receive a signal to/from the base station eNB during the predetermined period synchronized with the base station eNB side.

In step S103, the user apparatus UE switches, in the measurement gaps, a carrier for reception to a carrier (frequency) of another operator so as to monitor a D2D signal transmitted from a user apparatus UE of the other operator. The "monitoring" here is, for example, to receive a D2D signal of another operator to try demodulation and decoding. "Monitoring" may be replaced with "reception". For example, in the case where the D2D signal is a Discovery signal, when decoding of the Discovery signal succeeds, a user apparatus UE of the other operator can be recognized as a neighbor D2D terminal. Note that, as to the carrier (or frequency) of the other operator, the user apparatus UE may be notified of it by broadcast information or an RRC signal from a base station eNB to which the user apparatus UE connects or in which the user apparatus UE resides, or the user apparatus UE obtains it from a predetermined server by a function of an application of D2D, or the user apparatus UE may obtain it by any other methods.

In step S103, during a period other than the measurement gaps, normal cellular communication can be performed.

Also in step S103, the user apparatus UE receives broadcast information from a base station of the other operator by using the measurement gaps or other periods, for example, to be able to obtain D2D resource configuration information.

Here, for example, when the D2D resource configuration information of the other operator is changed, the user apparatus UE recognizes the change, transmits, to the base station eNB, a gap change request for requesting the changed measurement gap configuration (step S104), and receives a gap change response from the base station eNB (step S105). Accordingly, the user apparatus UE and the base station eNB are configured with changed measurement gaps, so that the user apparatus UE can perform monitoring of other operator's D2D signal by using the changed measurement gaps (step S106).

After that, for example, when it becomes not necessary to perform monitoring of a different frequency D2D signal, the user apparatus UE transmits a gap release request to the base station eNB (step S107). The base station eNB that receives the gap release request releases configuration of the configured measurement gaps to release the measurement gaps. Accordingly, the period which was the measurement gap can be utilized as cellular communication. Also, the user apparatus UE may release the measurement gaps, being triggered by transmission of a gap release request, or may release the measurement gaps, being triggered by receiving a response for the gap release request from the base station eNB.

Different from configuration of measurement gaps for conventional different frequency measurement in which signaling specific to the user apparatus UE is necessary, it is desirable that the measurement gaps for different frequency D2D monitoring are common between user apparatuses UE that require gaps. Thus, collective setting of measurement gaps may be made by broadcasting (SIB and the like) and/or (E)PDCCH Common search space. Also, it is not necessary to request gaps for each user apparatus UE (configuration of gaps may be performed without request of gaps). It is only necessary to request the gaps only when there occurs a mismatch between the assigned measurement gaps and a D2D resource monitored by the user apparatus UE.

As described above, the user apparatus UE requests the measurement gaps so that the base station eNB can obtain information equivalent to or more than exchange of D2D configuration using backhaul, for example. Also, the base station eNB configures measurement gaps according to the request, so that a D2D resource pool of a measurement target can be included in subframes where the user apparatus UE can measure, for example. Consequently, reduction of battery consumption of the user apparatus UE and ensuring of cellular communication available time are realized.

Also, by performing gap change request, for example, change of D2D configurations of the other operator can be followed. Also, by the gap release request, for example, it becomes possible that, when the user apparatus UE does not need to perform the other operator D2D monitoring any more, unnecessary gaps can be released and resources of cellular communication can be increased.

(On Measurement Gap)

Next, in the present embodiment, an example of measurement gaps configured in the user apparatus UE and the base station eNB is described.

Transmission of a D2D signal in LTE is performed by using a part of resources in a time-frequency area (D2D resource pool) assigned for D2D that arrives periodically (example: Discovery period). Therefore, in the present embodiment, the user apparatus UE obtains, from broadcast information received from a base station of another operator, the D2D resource configuration information (cycle in which the D2D resource pool arrives, time length of the D2D resource pool and the like), and transmits a gap configuration request based on this so as to configure measurement gaps.

Figure 4:
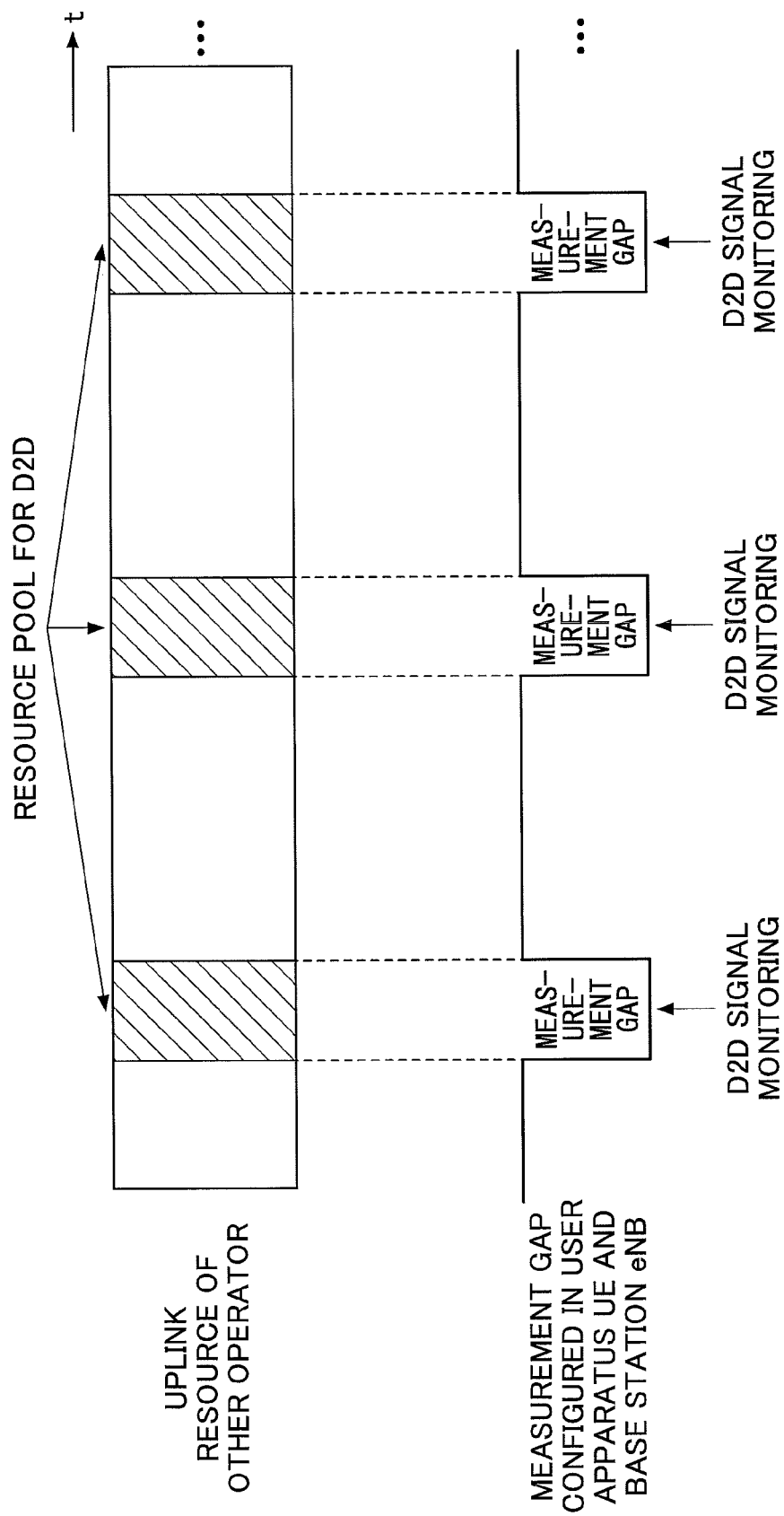
FIG. 4 is a diagram for explaining an example of a configured measurement gap.

FIG. 4 shows an example of measurement gaps in the present embodiment. In the example of FIG. 4, as shown in the figure, a D2D resource pool is assigned on an uplink resource of the other operator. Note that, also in the frequency direction, the D2D resource pool takes a length of a part of the uplink resource. But, in this example, for the sake of simplicity of explanation, it is shown in the figure by focusing on the time direction.

On the other hand, the measurement gaps shown in FIG. 4 configured in the user apparatus UE and the base station eNB are configured such that measurement gaps agree with the arriving cycle and the time length of the D2D resource pool. In each measurement gap shown here, the user apparatus UE monitors a D2D signal transmitted from user apparatuses of another operator transmitted by a part of resources of the D2D resource pool. The "D2D resource pool" described here can be interpreted as individual subframes for D2D indicated by a bitmap in the D2D resource configuration described later by referring to FIG. 17, or may be interpreted as periods (periods shown by A, B, and C and the like in FIG. 17) during which subframes for D2D can exist.

The time length of the measurement gap may be the same as the time length of the D2D resource pool as shown in FIG. 4, or the time length of the measurement gap may be set to be longer than the time length of the D2D resource pool. By setting the time length of the measurement gap to be longer than the time length of the D2D resource pool (that is, by including), a time misalignment can be covered. Also, for example, in a case where a resource (time length) actually used for transmission of a D2D signal in the D2D resource pool is narrow and the narrow time position can be ascertained, the time length of the measurement gap may be set shorter than the time length of the D2D resource pool and the time position may aligned with a time position at which a D2D signal can be transmitted.

For performing the above-mentioned configuration, for example, the user apparatus UE obtains, from D2D resource configuration information received from a base station of the other operator, an arrival cycle (example: interval of SFN or/and subframe, and the like), a start position (offset value, example: pool start subframe number at a top frame where a D2D resource pool exists, and the like), a time length (example: the number of subframes) and the like of a D2D resource pool, converts them into parameters (SFN, subframe and the like) in the connecting or residing cell as necessary, and transits the arrival cycle, start position, time length and the like of D2D resource pool of another operator that are represented as parameters in the connecting or residing cell, by including them in the gap configuration request, to the base station eNB. The base station eNB configures measurement gaps shown in FIG. 4, for example, based on the received information. The user apparatus UE also configures the same measurement gaps. The "connecting or residing cell" is a cell to which the UE is connected or in which the UE resides, and the cell may be referred to as a serving cell.

Since it is assumed that there are a plurality of operators as other operators, a plurality of types of measurement gaps may be configured. In this case, the user apparatus UE may transmit a gap configuration request to each other operator. In this case, an ID may be provided for each type of measurement gaps so that the gap configuration request may be transmitted by including the ID. Accordingly, each of the user apparatus UE and the base station eNB can hold configuration information of measurement gaps and an ID by associating them with each other, so that, for example, by transmitting a gap change request/release request specifying an ID, change/release of the measurement gaps can be performed efficiently. Even when the number of the type of measurement gaps is one, an ID may be provided.

Figure 5:
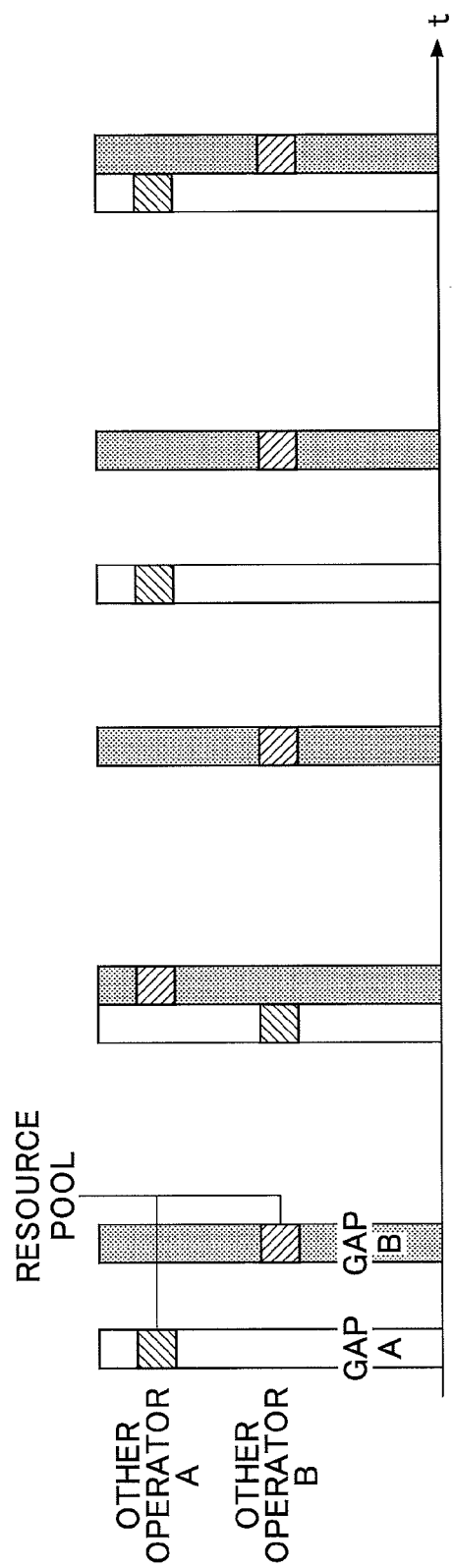
FIG. 5 is a diagram showing an example when configuring a plurality of measurement gaps.

FIG. 5 shows an example of a case where a plurality of measurement gaps are configured. In the example shown in FIG. 5, gaps B for D2D signal of another operator B and gaps A for D2D signal pf another operator A are configured. Note that, when a plurality of types of gaps overlap or continue, these may be merged and used. Also, measurement gaps for receiving a broadcast signal of another operator may be configured.

As mentioned above, by configuring measurement gaps to conform to a D2D resource pool of the other operator, D2D signal monitoring of the other operator can be efficiently performed with a minimum gap time.

(On Signal for Gap Configuration, Change and Release)

For transmitting a gap configuration request, a gap change request, and a gap release request described with reference to FIG. 3, an upper layer signaling signal such as RRC or MAC may be used, or PUCCH may be used. Also, for a response or configuration from the base station eNB to the user apparatus UE, an upper layer signaling signal such as RRC or MAC may be used, or (E) PDCCH may be used.

It is only necessary that the gap configuration request or the gap change request includes information indicating arrival cycle of measurement gaps, time length (duration time) of a measurement gap, a start position of measurement gaps, and the like, and the format of the information is not limited to a specific format. For example, existing configuration information of measurement gaps can be diverted. The above-mentioned information is information generated based on D2D resource configuration information received from a base station of another operator by the user apparatus UE. Instead of that, the user apparatus UE may include, in the gap configuration request/gap change request, D2D resource configuration information (resource pool information, synchronization signal resource information and the like) received from a base station of another operator. In this case, the base station eNB generates information indicating arrival cycle, time length (duration time), and start position for the own cell from the D2D resource configuration information so as to configure measurement gaps, and the base station eNB returns these pieces of information to the user apparatus UE by a gap configuration response/gap change response, so that the user apparatus UE is also configured with the measurement gaps.

Also, in addition to the above-information, the gap configuration request/gap change request may include any one of or a plurality of (which may all of) "gap type", "monitor target PLMN, band or carrier", "D2D resource configuration information" (when cycle, time length, start position are main information), and "gap ID".

The "gap type" is defined assuming that configured measurement gaps are used for a plurality of types of usage. As the value, for example, there are "different frequency D2D monitoring", "different frequency FDD LTE monitoring" and the like. Also, by specifying "gap type" from the user apparatus UE, the base station eNB can ascertain that it is for D2D, for example, so that it becomes possible to configure similar gaps for other user apparatus UE that desires D2D monitoring. The "gap type" may be notified from the base station eNB to the user apparatus UE. In that case, the user apparatus UE may execute measurement conforming to the "gap type", or may perform desired measurement irrespective of "gap type".

"Monitor target, PLMN, band or carrier" indicates which band or carrier of which operator's network to monitor. It is possible that this information is not included in the gap configuration request/gap change request, but is included in the gap configuration response/gap change response.

Figure 6:
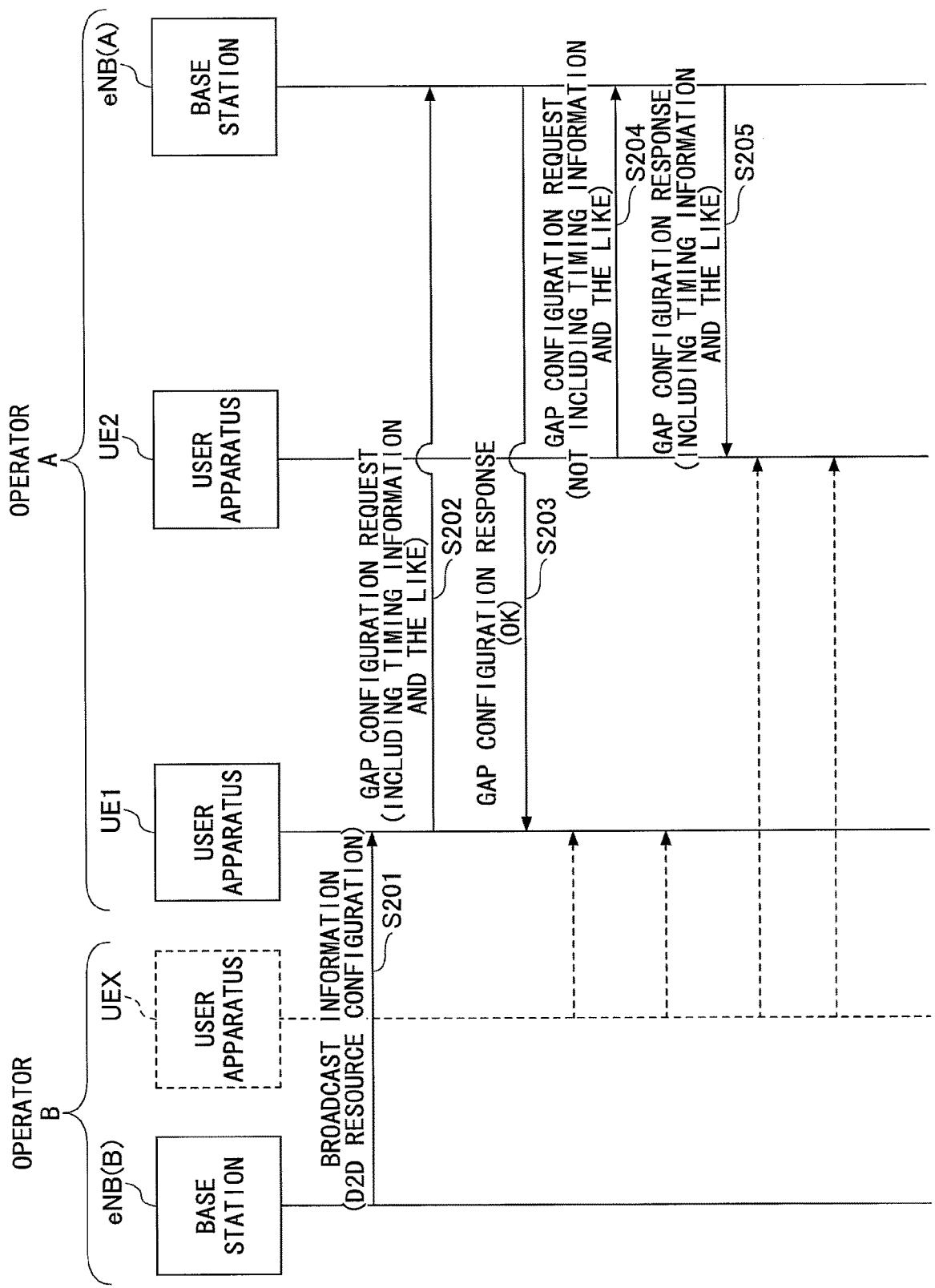
FIG. 6 is a diagram for explaining an example of information included in a gap configuration request and a gap configuration response.

Examples of pieces of information included in the gap configuration request and the gap configuration response are described with reference to FIG. 6. In the example of FIG. 6, there are an operator A and an operator B as shown in the figure.

In step S201 of FIG. 6, the user apparatus UE1 receives broadcast information from the base station eNB(B) of the operator B to obtain D2D resource configuration information. The user apparatus UE1 determines, based on this information, cycle/time length/start position and the like of a measurement gap to configure, and transmits a gap configuration request including these to the base station eNB(A) (step S202). The base station eNB (B) holds the cycle/time length/start position as measurement gap information for different frequency D2D signal monitoring.

The base station eNB (A) returns a gap configuration response to the user apparatus UE1 (step S203). It is only necessary that gap configuration response in this case includes information indication OK, for example. The reason is that the user apparatus UE1 ascertains cycle/time length/start position of the measurement gap to be configured. Note that, based on determination by the base station eNB (A), when the base station eNB (A) desires to configure measurement gaps different from the cycle/time length/start position included in the gap configuration request, the gap configuration response may include the information of the cycle/time length/start position.

The user apparatus UE that received the gap configuration response in step S203 configures the measurement gaps, so that the user apparatus UE can monitor a D2D signal transmitted from a user apparatus UE-X of an operator B, for example, by using the measurement gaps.

After that, for example, the user apparatus UE2 of the operator A transmits a gap configuration request, that does not include information of cycle/time length/start position, indicating to desire to perform different frequency D2D signal monitoring (step S204). In the present embodiment, for example, assuming a case where the user apparatus UE2 cannot obtain D2D resource information of the other operator, it is made available to transmit the gap configuration request such as one in step S204. The base station eNB that received the gap configuration request configures measurement gaps for the user apparatus UE2 using information of cycle/time length/start position that has already been held, and returns a gap configuration response including the information of the cycle/time length/start position to the user apparatus UE2 (step S205). Accordingly, the user apparatus UE2 can perform different frequency D2D signal monitoring by configuring proper measurement gaps. According to such a control, signaling overhead can be decreased.

(On DRX)

Figure 7:
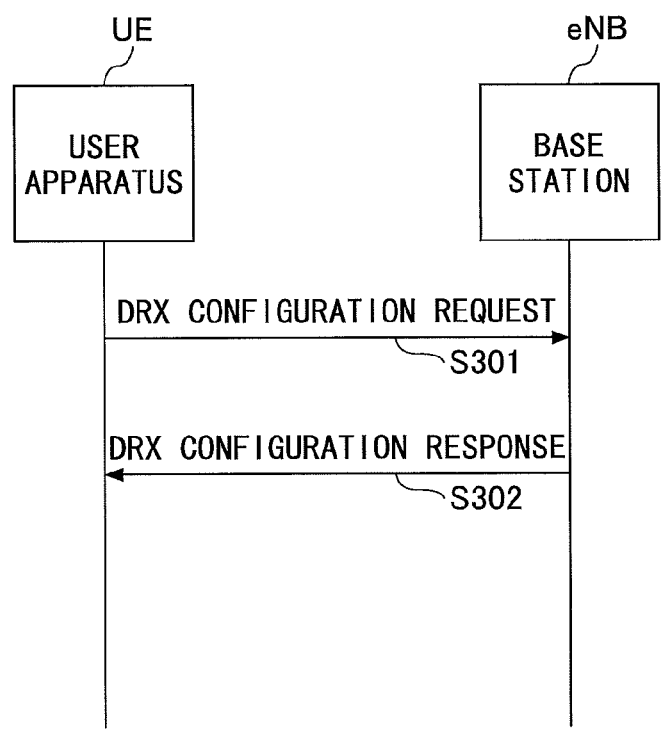
FIG. 7 is a sequence diagram when performing transition request to a DRX state.

In the present embodiment, in addition to (or instead of) performing configuration of measurement gaps, transition to a DRX (discontinuous reception) state may be performed. For example, as shown in FIG. 7, first, the user apparatus UE transmits a DRX configuration request to the base station eNB (step S301). The DRX configuration request may include, for example, timing for transition to DRX (SFN, subframe number, and the like), DRX configuration information (cycle, time length of active period, and the like). The base station eNB that receives the DRX configuration request holds the information of DRX as DRX configuration information for the user apparatus UE so as to perform DRX by being synchronized with the user apparatus UE according to the configuration information (no scheduling during non-active period, and the like). Also, in step S302, a DRX configuration response is returned from the base station eNB to the user apparatus UE. Being triggered by this response, the user apparatus UE performs transition to DRX and the like that is requested.

The information included in the DRX configuration request may be any information as long as the information can identify a timing for transition to DRX and what DRX to perform (cycle, length of active period, and the like). For example, information similar to that of an existing DRX configuration may be used.

Configuration of DRX may be performed by transmitting a DRX configuration request including DRX configuration information as mentioned above, or existing DRX configuration that is made from the base station eNB to the user apparatus UE may assume different frequency D2D monitoring. As the configuration content, there are, for example, drx-InactivityTimer, DRX Cycle, drx-RetransmissionTimer, onDurationTimer, various offset values and the like (refer to non-patent documents 2, 3, for example for details). In the case where different frequency D2D signal monitoring is assumed, for example, it can be considered that configuration is made such that non-active period becomes longer, and the like.

Figure 8:
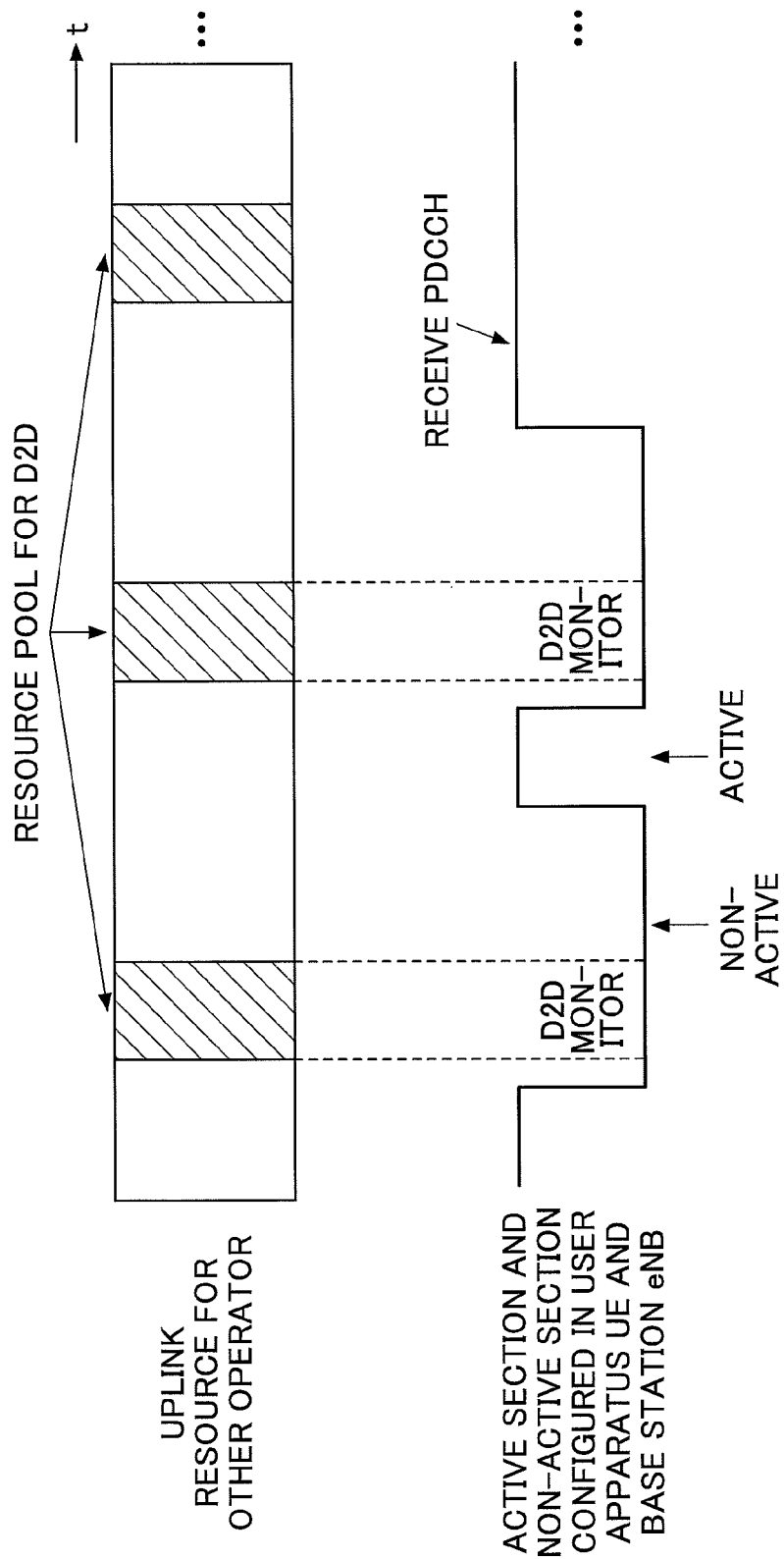
FIG. 8 is a diagram for explaining an example of D2D signal monitoring in a DRX state.

With reference to FIG. 8, an example for performing different frequency D2D signal monitoring is shown when the user apparatus UE is in a DRX state. As shown in FIG. 8, the user apparatus UE in the DRX state monitors a carrier (frequency) of a different frequency D2D signal in a non-active section (section in which transmission and reception of a signal to/from the connecting cell are not performed). Especially, when the user apparatus UE ascertains a timing of a D2D resource pool of the other operator, D2D signal monitoring (trial of demodulation and decoding) may be performed only in a period of the resource pool. The example of FIG. 8 shows that, since the user apparatus UE receives a PDCCH addressed to the user apparatus UE itself in an active section, the user apparatus UE continues to be in an active state after that.

Transition to a DRX state based on the DRX configuration request may be performed after retransmission (L1 or L2 retransmission, for example) completes.

Figure 9:
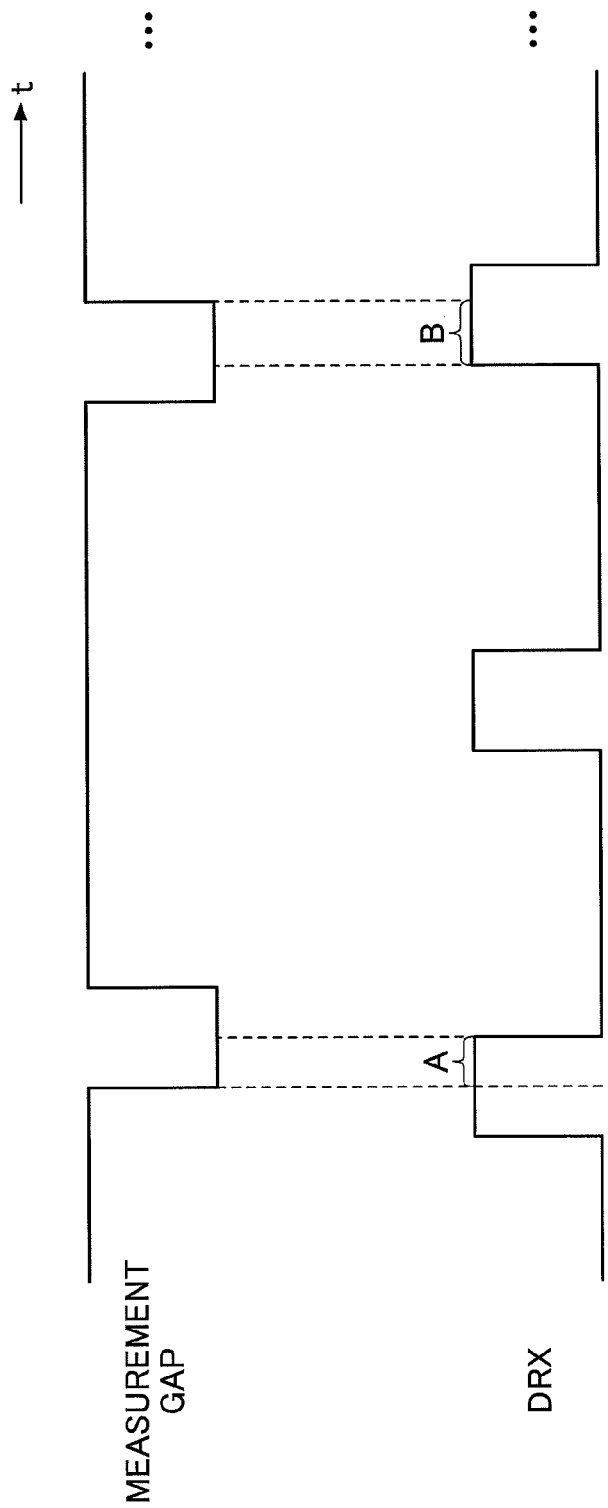
FIG. 9 is a diagram for explaining an operation example when an active section of DRX overlaps with a measurement gap.

In the present embodiment, the user apparatus UE transmits the gap configuration request and transmits a DRX configuration request (transition request), so that the user apparatus UE may become in a DRX state when measurement gaps are configured. Also, when measurement gaps are configured, there may be a case where the user apparatus UE becomes in an existing DRX state. In such cases, the measurement gaps may collide with on duration (active section) of DRX. In such a case, as shown in A, B of FIG. 9, PDCCH may be monitored by prioritizing on duration.

It is possible that, the request of the gap and/or the request for DRX transition can be performed by only a user apparatus UE authenticated for different frequency D2D monitoring. More specifically, for example, identification information of a user apparatus UE that is allowed to perform different frequency D2D monitoring is registered in an authentication apparatus provided on a network, and, for example, the user apparatus UE transmits an authentication request by transmitting the identification information to the authentication apparatus when the user apparatus UE desires to request gaps and/or DRX transition, so that the user apparatus UE can perform request of gaps and/or request of DRX transition, being triggered by reception of authentication OK from the authentication apparatus.

Separately from the request for the measurement gaps and/or the request for transition to DRX state, the user apparatus UE may report obtained different frequency D2D configuration information (resource pool configuration and the like) to a connecting or residing cell. The reporting may be performed based on an instruction from the base station eNB.

For each request, response or report and the like in the above-mentioned explanation, upper layer signaling (including SIB, RRC signaling, MAC) may be used, or (E)PDCCH/PUCCH may be used.

(On UE Capability Notification)

In the present embodiment, the user apparatus UE may notify the base station eNB of UE capability (capability) indicating whether the user apparatus UE supports different frequency D2D signal monitoring by an upper layer signaling.

In the case where the user apparatus UE notifies of UE capability indicating that the user apparatus UE supports different frequency D2D signal monitoring, the user apparatus UE may notify of a list of bands (and/or frequency carriers) for which different frequency D2D signal monitoring is supported, or the base station eNB may regard that supported bands of LTE or D2D notified from the user apparatus UE are also supported for different frequency D2D monitoring.

Also, in addition to or instead of capability information indicating whether to support different frequency D2D signal monitoring, gap configuration capability (transmission capability of gap configuration request and the like) may be notified as capability information.

Also, in addition to capability information indicating whether to support different frequency D2D signal monitoring, or separately from that, the user apparatus UE may notify the base station eNB of necessity of gap configuration. For example, when different frequency D2D signal monitoring is available without gaps since the user apparatus UE has a plurality of receivers including a receiver that can monitor a different frequency D2D signal, notification indicating that gap configuration is unnecessary may be transmitted.

Also, instead of UE capability notification, operation notification indicating whether to perform (whether to desire to perform) different frequency D2D signal monitoring may be performed.

Figure 10:
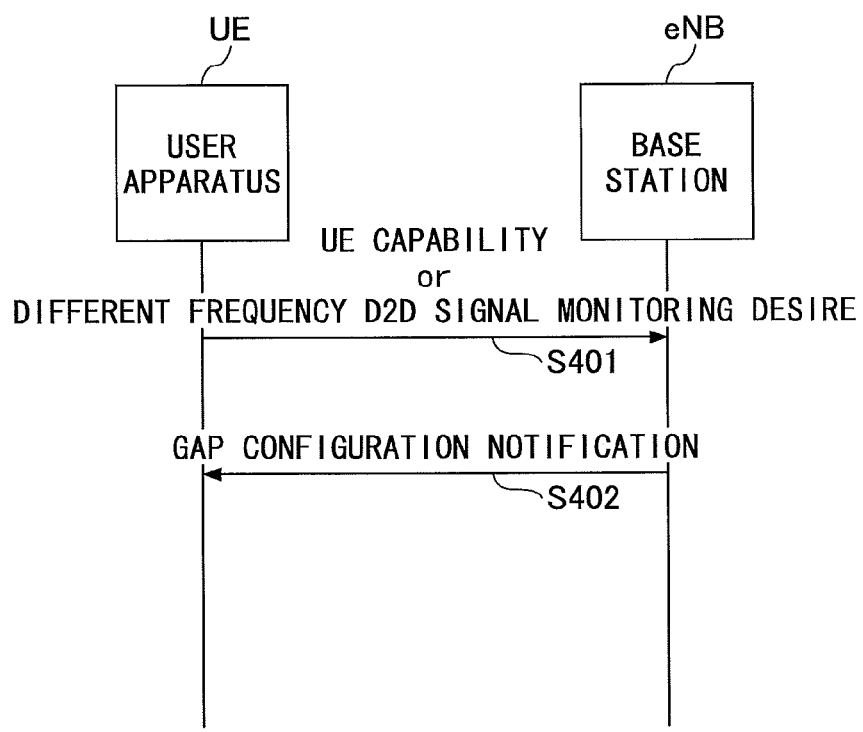
FIG. 10 is a sequence diagram showing an example of a case where UE capability (or different frequency D2D signal monitoring desire) is reported.

A sequence example of UE capability notification and operation desire notification is shown in FIG. 10. In this example, the user apparatus UE notifies the base station eNB of capability information indicating that different frequency D2D signal monitoring is supported or notifies the base station eNB that the user apparatus UE desires different frequency D2D signal monitoring (step S401). It is assumed that the base station eNB holds gap configuration information suitable for different frequency D2D signal monitoring by a gap configuration request and the like from another user apparatus UE. Since the base station eNB can ascertain that the user apparatus UE is able to (desires to) perform different frequency D2D signal monitoring by the received information in step S401, the base station eNB can transmit, to the user apparatus UE, a gap configuration notification including the gap configuration information (step S402). Accordingly, the user apparatus UE can configure measurement gaps and can perform different frequency D2D signal monitoring.

As mentioned above, it becomes possible, based on gap configuration request and the like for different frequency D2D signal monitoring notified (or reported) from a user apparatus UE, to configure measurement gaps suitable for different frequency D2D signal monitoring also for another user apparatus UE. Also, by the capability notification, the base station eNB can know a user apparatus UE in which measurement gaps suitable for different frequency D2D signal monitoring should be configured.

(On Gap Block)

As to the measurement gap that periodically arrives as described with reference to FIG. 4 and the like in the present embodiment, each single measurement gap may be continuous subframes, or may be discontinuous subframes. As mentioned above, the measurement gap can take various patterns of subframes.

In the present embodiment (including modified examples), the smallest unit of a subframe pattern is to be referred to as a D2D gap block ("gap block" hereinafter). In the following, the gap block is described in detail.

The gap block arrives, for example, as shown in FIG. 4, at every predetermined time (gap interval). As described later with reference to FIG. 16, the gap interval may be sequentially changed by time hopping.

A configuration example of a gap block is shown in FIGS. 11(a) and (b). FIG. 11(a), (b) show a gap block A and a gap block B that are separated by a predetermined time interval.

In the example shown in FIG. 11(a), each gap block is formed by 7 subframes, and each gap block includes a D2D signal reception available subframe and subframes other than that. The D2D signal reception available subframe is a subframe for receiving (monitoring) a target D2D signal of different frequency, wherein the subframe becomes a gap (a period during which communication is not performed) for a cellular signal of the serving cell. In the gap, at least DL signal reception in the serving cell is not performed. That is, during the period, the base station eNB does not perform transmission of a DL signal for the user apparatus UE. Note that a cellular signal is a normal signal that is not a D2D signal and that is transmitted and received between a base station eNB and a user apparatus UE.

Configuration information (cycle, time length, start time position and the like) of the gap block can be determined and configured based on D2D resource configuration information of another operator in the same way as the configuration of "measurement gap" described with reference to FIG. 3-FIG. 6 and the like.

An arrangement pattern (pattern indicating which subframe is used as a gap) of the D2D signal reception available subframe (gap for serving cell) in the gap block may be predetermined or may be configured by being included in a gap configuration response from the base station eNB to the user apparatus UE, or may be configured by a signaling different from the gap configuration response. The pattern may be common to UEs (common within the cell) and may be configured by broadcast information, or the pattern may be UE specific and may be configured by a UE specific RRC signal.

Also, the above-mentioned arrangement pattern may be configured such that the arrangement pattern agrees with subframes indicating D2D resources represented by a bitmap in D2D resource configuration information of another operator.

Figure 11:
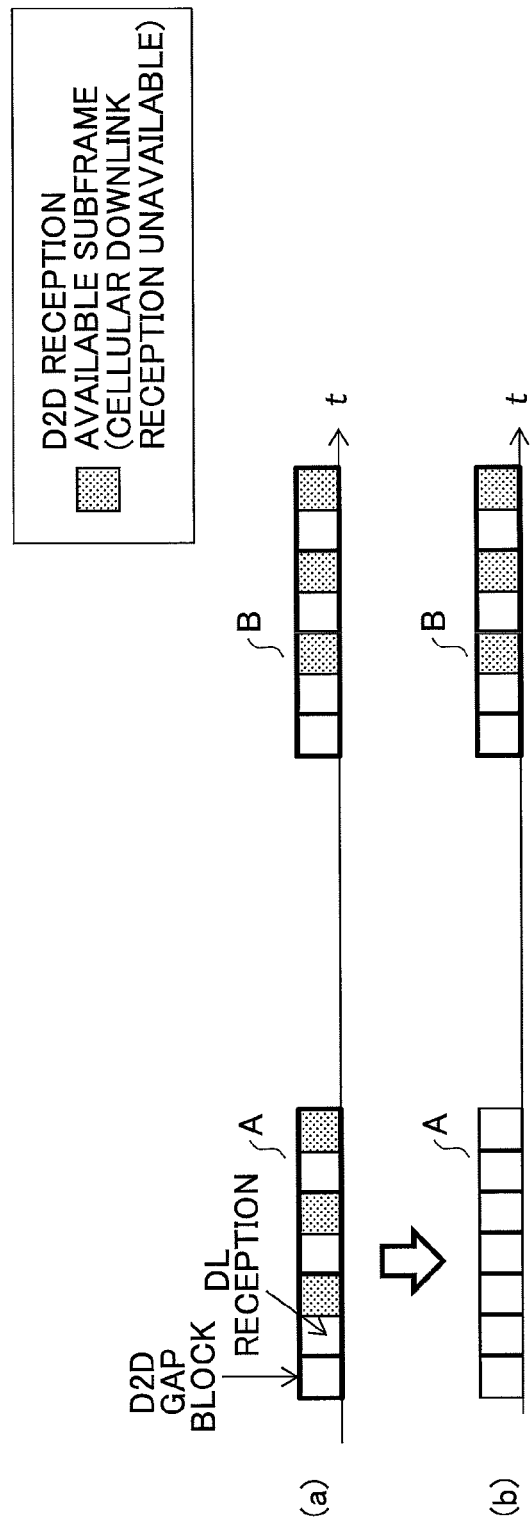
FIG. 11 is a diagram for explaining a D2D gap block.

As exemplified in the gap block A of FIGS. 11 (a), (b), when the user apparatus UE finds a (E)PDCCH addressed to the user apparatus UE in a subframe other than a gap in the gap block, the user apparatus UE discards gaps after that in the gap block, so that all subframes after that in the gap block can be utilized for cellular communication.

As shown in FIGS. 11 (a), (b), even when a (E)PDCCH addressed to the user apparatus UE itself is detected in the gap block A, gaps are configured in accordance with the arrangement pattern in the next gap block B (unless (E)PDCCH addressed to the user apparatus UE itself is detected).

For example, the user apparatus UE can receive downlink data by receiving downlink resource assignment by the (E)PDCCH reception, and also the user apparatus UE can return a feedback such as ACK/NACK in the gap block in which gaps are released.

Also, the user apparatus UE can transmit uplink data by receiving uplink resource assignment (UL grant) by the (E)PDCCH reception, and also the user apparatus UE can receive a feedback such as ACK/NACK in the gap block in which gaps are released.

By performing the above-mentioned operation, it becomes possible to detect a different frequency D2D signal while keeping influence to cellular communication due to measurement gaps to a minimum.

In the example shown in FIG. 11(a), (b), operation is performed in which, being triggered by reception of a DL signal such as the (E)PDCCH, gaps in the gap block are released. However, operation may be performed in which, being triggered by an UL signal transmission from the user apparatus UE, gaps are released.

That is, when the user apparatus UE performs UL signal transmission in a subframe other than gaps in the gap block, the user apparatus UE may discard gaps after that in the gap block so as to utilize all subframes after that in the gap block for cellular communication. Also in this case, like the case shown in FIGS. 11 (a), (b), in the next gap block B, gaps are configured according to the arrangement pattern in the next gap block B (as long as there is no discard trigger).

An UL signal that becomes the trigger for discarding the gaps is, for example, SR (Scheduling Request), BSR (Buffer Status Report), and RACH preamble and the like. The reason is that, when UL transmission of these signals occurs, it can be considered that data that is required to be transmitted in cellular communication occurs in the user apparatus UE.

(On UE Operation in Measurement Gaps)
<Transmission and Reception of D2D Signal>

So far, it has been mainly described that the user apparatus UE receives a different frequency D2D signal in a measurement gap. However, the user apparatus UE may perform transmission of a different frequency D2D signal in a measurement gap.

Whether the user apparatus UE performs D2D signal transmission in a measurement gap may be specified as operation of the user apparatus UE, or may be instructed to the user apparatus UE from the base station eNB by a signaling. As the signaling of the instruction, for example, broadcast information (in the case of UE common) and a UE specific RRC signal (in the case of UE specific configuration) are used. Signals for the signaling of the instruction are not limited to these, and, for example, a MAC signal or a PHY signal may be used for the instruction.

<On UL Transmission of a Cellular Signal in Measurement Gaps>

In the present embodiment, since monitoring (that is, reception) of a different frequency D2D signal is performed in measurement gaps, DL signal reception of the serving cell is not available in the measurement gaps. UL signal transmission in the serving cell in the measurement gaps may be determined to be unavailable like the DL signal reception, or UL signal transmission may be allowed.

In the case where the UL signal transmission of the serving cell in the measurement gaps is allowed, three of D2D signal transmission, D2D signal reception and cellular UL signal transmission may occur at the same time in a period of a gap. However, only one of them can be performed at the same time. Thus, in the present embodiment, among these, cellular UL signal transmission may be prioritized. For example, when a trigger of cellular UL signal transmission (occurrence of timing of SRS/CQI/ACK•NACK, occurrence of UL data, or the like) occurs, cellular UL signal transmission can be performed without performing either D2D signal transmission or D2D signal reception. According to such an operation, deterioration of cellular performance can be suppressed as much as possible.

Contrary to the above, it is possible that DL signal reception as well as UL transmission are not performed in the serving cell in the measurement gaps. Accordingly, in exchange for deterioration of cellular performance, D2D performance improves.

Also, according to the type of cellular UL signal, it may be determined whether to perform UL transmission in the measurement gaps. For example, it can be determined not to perform periodic SRS transmission in the same carrier. The reason is that, even when periodic SRS transmission is not performed, large effect is not exerted on the performance of the cellular communication.

For example, since it can be considered that UL transmission such as CQI and ACK/NACK and the like largely affects performance of cellular communication of the user apparatus UE, the UL transmission may be given priority over the D2D signal transmission and reception in measurement gaps.

As mentioned above, in a measurement gap, there are two patterns of "allowing cellular UL signal transmission without performing only cellular DL signal reception" and "not performing both of cellular DL signal reception and cellular UL signal transmission". Also, when cellular UL signal transmission is allowed, there are patterns such as "cellular UL signal transmission is prioritized over D2D signal transmission and reception", "only specific UL signal is prioritized over D2D signal transmission and reception" and the like.

What operation to perform in what priority by the user apparatus UE may be specified as operation of the user apparatus UE, or what operation to perform may be instructed from the base station eNB to the user apparatus UE by a signaling. As the signaling of the instruction, for example, broadcast information (in the case of UE common) and a UE specific RRC signal (in the case of UE specific configuration) are used. Signals for the signaling of the instruction are not limited to these, and, for example, a MAC signal or a PHY signal may be used.

Modified Example

In the example described so far, basically, each of the user apparatus UE and the base station eNB is configured with measurement gaps based on D2D resource configuration information of another operator for different frequency D2D signal monitoring.

When configuring the measurement gaps in conformity with D2D resource configuration information of the other operator, it can be considered that a situation periodically arrives in which UEs concurrently perform D2D signal monitoring or transmission at a specific subframe. Thus, there is a possibility in that it is not desirable from the viewpoint for keeping performance of cellular communication.

In the present embodiment, it is possible that measurement gaps can be configured by combining D2D resource configuration information and time hopping such that arrival of measurement gaps is distributed. Also, the time hopping may be used independently irrespective of D2D resource configuration information. In the following, these are described as a modified example.

<On Measurement Gaps in the Modified Example>

In the modified example, time hopping is applied to measurement gaps, so that, even when D2D resource configuration of another operator cannot be ascertained, probability in that the user apparatus UE can receive a different frequency D2D signal is increased as much as possible. Concrete examples of a time hopping pattern are described later.

Figure 12:
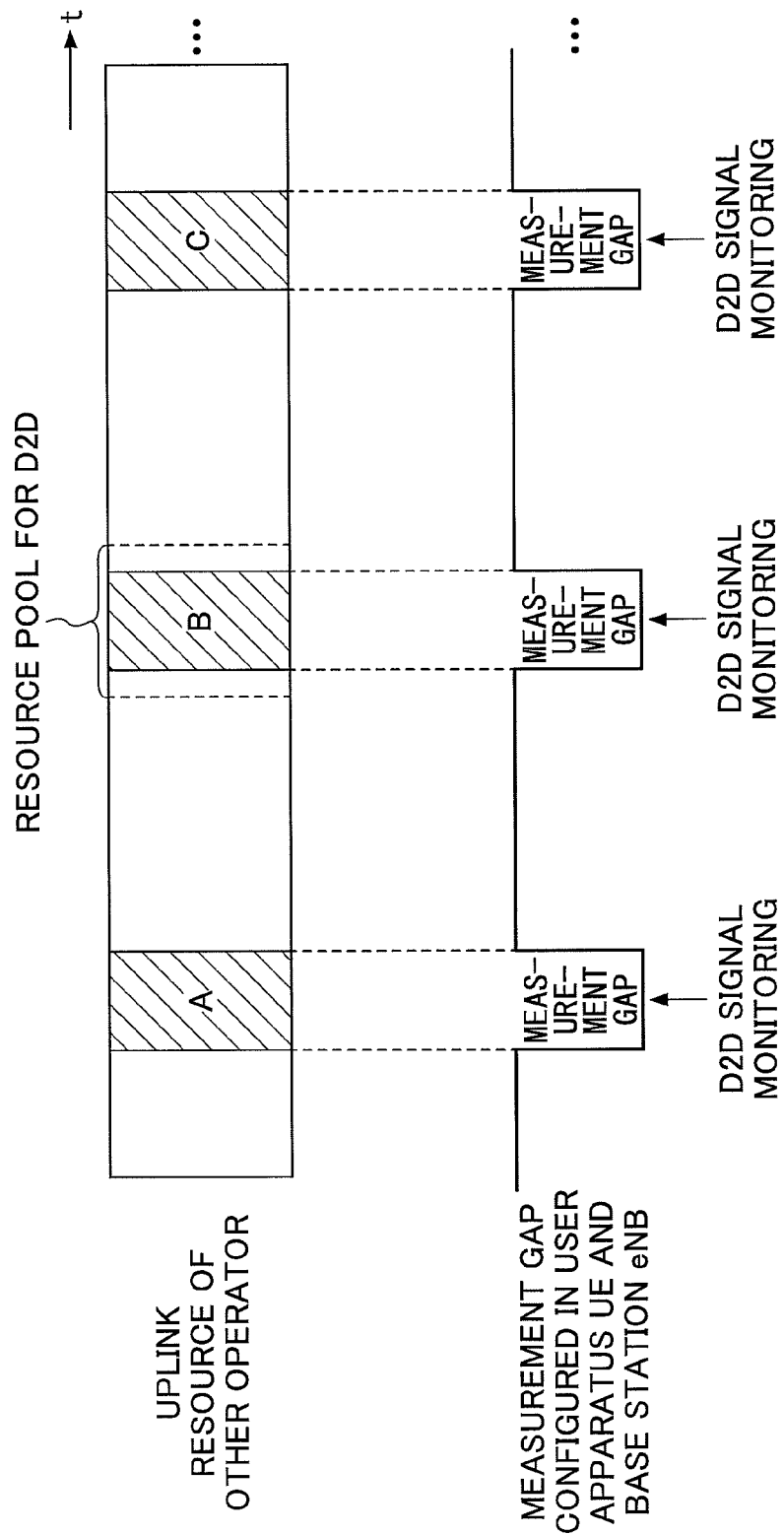
FIG. 12 is a diagram for explaining a measurement gap in an modified example.

FIG. 12 shows an example of measurement gaps in the modified example. In the example of FIG. 12, as shown in the figure, a resource pool for D2D is assigned to an uplink resource of another operator. Also, as shown in the figure, measurement gaps are configured in the user apparatus UE and the base station eNB. Time hopping is applied to the measurement gaps, and FIG. 12 schematically shows three A-C of time hopped measurement gaps.

In the example of FIG. 12, the measurement gap shown in B overlaps with a D2D resource pool of the other operator, and in the gap, there is a possibility in that the user apparatus UE can receive a different frequency D2D signal transmitted from a user apparatus UE of the other operator, and also, there is a possibility in that a different frequency D2D signal transmitted from the user apparatus UE can be received by the user apparatus UE of the other operator.

<On Time Hopping Pattern>

Figure 13:
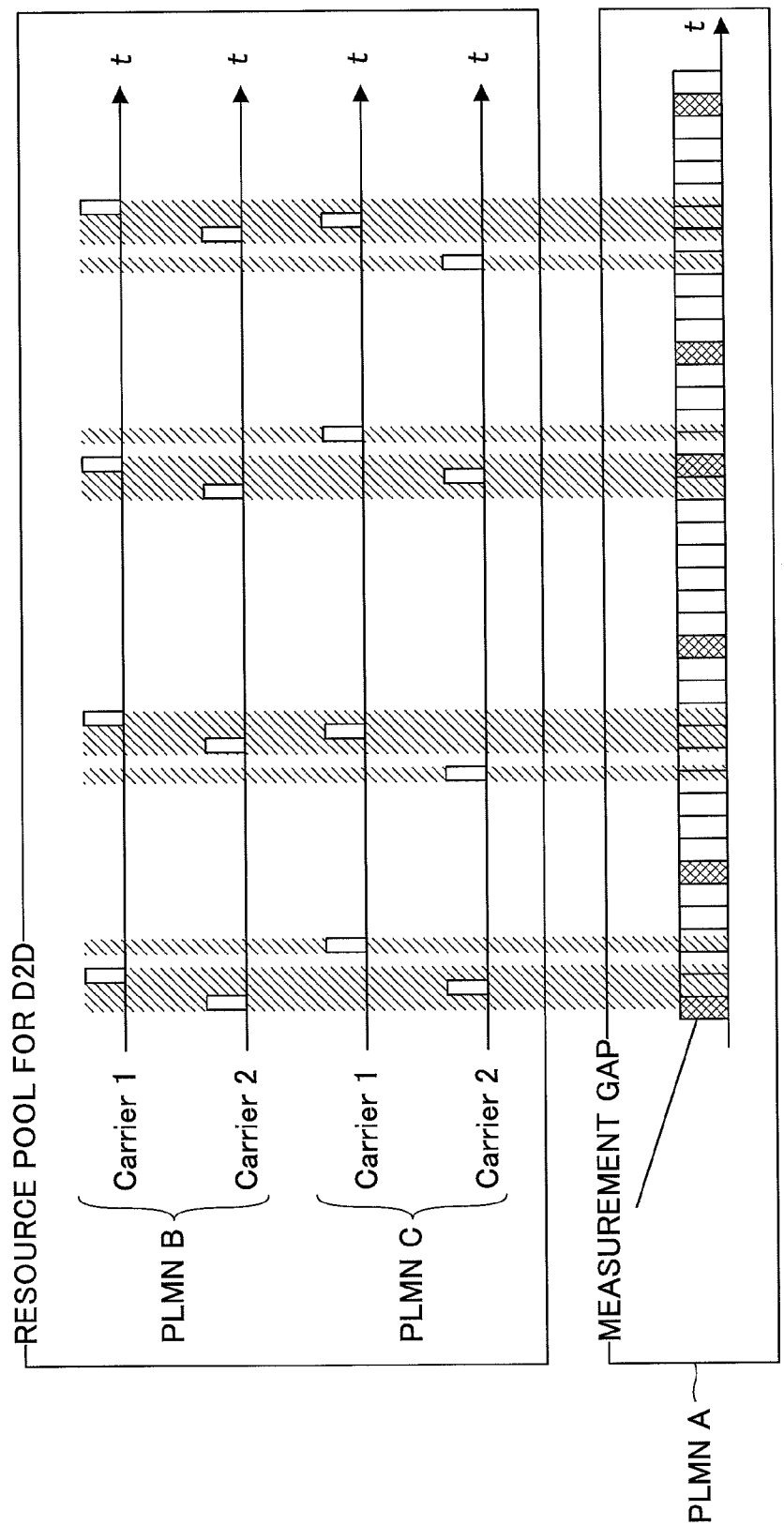
FIG. 13 is a diagram when applying time hopping to measurement gaps.

FIG. 13 shows an image when applying time hopping to measurement gaps. The example of FIG. 13 shows that a measurement gap in which time hopping is applied sequentially arrives (shaded subframes in the figure) for a user apparatus UE (and base station eNB) in a PLMN-A (operator A).

On the other hand, FIG. 13 shows that, in PLMN-B and C (operators B and C), D2D resource pools are configured by a carrier 1 and a carrier 2 respectively, so that a D2D signal transmission is performed using the D2D resource pools.

Although the user apparatus UE of the operator A does not ascertain configuration information of D2D resources of the operators B and C, measurement gaps that overlap with D2D resource pools in the operators B and C occur by using measurement gaps to which time hopping is applied. If the measurement gaps are set to be periodical without time hopping, and if the period is almost the same as a period of the D2D resource pool of another operator, when the measurement gap does not overlap with the D2D resource pool of the other operator at the start time, the measurement gap does not overlap with the D2D resource pool of the other operator even though time elapses, so that the user apparatus UE cannot receive a D2D signal of the other operator. On the other hand, by applying time hopping, the possibility becomes high in that a different frequency D2D signal can be received by avoiding such a situation. Same applies to the case for transmitting a different frequency D2D signal. By performing transmission at an arriving measurement gap to which time hopping is applied, the possibility in that the receiving side can receive the D2D signal becomes high.

<Configuration of Measurement Gaps>

Figure 14:
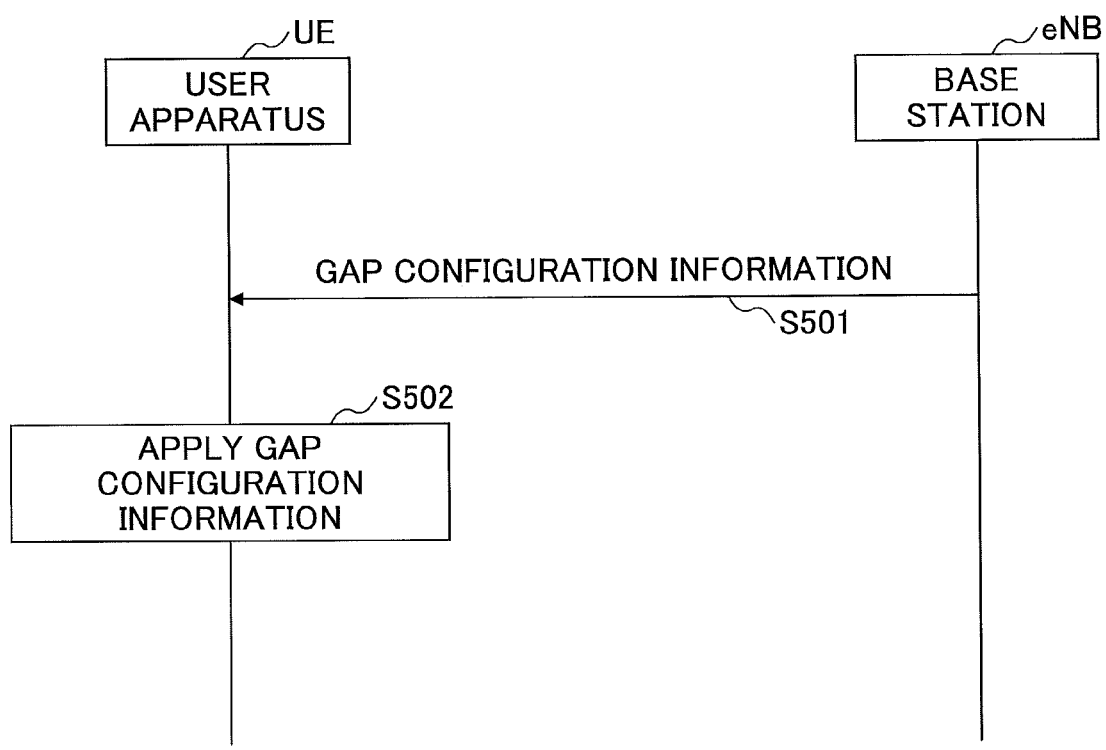
FIG. 14 is a diagram showing an example of signaling for applying a time hopping pattern.

An example of configuration signaling of measurement gaps in the modified example is shown in FIG. 14. As shown in FIG. 14, the base station eNB transmits, to the user apparatus UE, gap configuration information (gap configuration) (step S501). The user apparatus UE receives the gap configuration information from the base station eNB to apply the gap configuration information (step S502).

Notification of gap configuration information in step S501 can be performed by using broadcast information (SIB and the like), for example. Notification of gap configuration information may be performed by a UE specific RRC signal. These are merely examples, and notification of gap configuration information may be performed by a MAC signal, a PHY signal and the like.

Note that, even when each UE in a serving cell is notified of the same configuration information by broadcast information, as described later, it is possible to configure gaps of different time hopping for each UE by determining a time hopping pattern based on UE specific information such as UE-ID and the like.

The base station eNB holds gap configuration information to be applied to each user apparatus UE, so that the base station eNB can always ascertain whether each user apparatus UE is in a gap or not. Accordingly, it becomes possible, for example, that the base station eNB can perform control in which the base station eNB does not perform downlink and/or uplink scheduling in a gap period.

Note that, the signaling shown in FIG. 14 may be a signaling for configuring a time hopping pattern as an arrangement pattern of subframes for measurement gaps that have already been configured by a method (FIG. 3 and the like) described so far.

Next, an example 1 and an example 2 of time hopping patterns in the modified example are described.

<Time Hopping Pattern Example 1>

Figure 15:
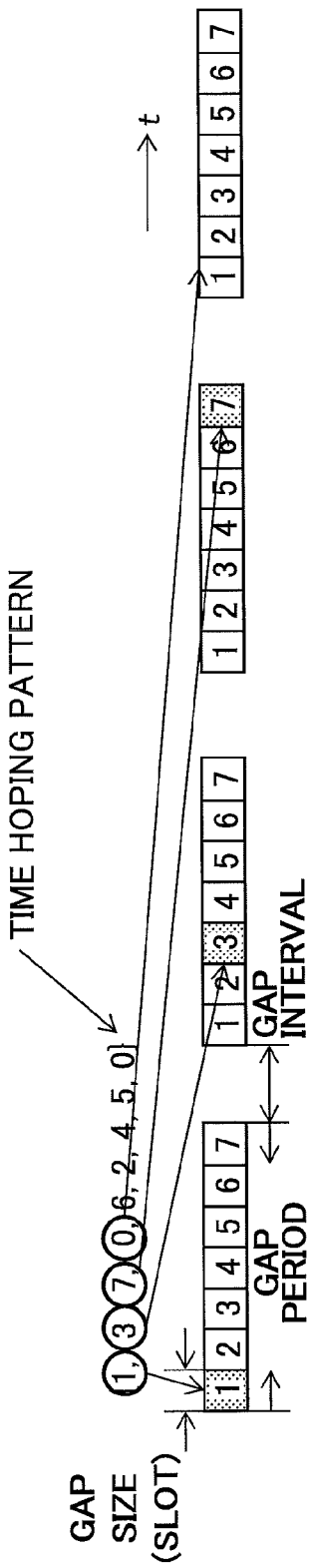
FIG. 15 is a diagram showing an example 1 of a time hopping pattern.

FIG. 15 shows a time hopping pattern example 1 as a configuration example of a measurement gap to which time hopping is applied. In this example, the gap configuration information notified from the base station eNB to the user apparatus UE includes, for example, a gap period indicating a period of a measurement gap, a gap interval indicating an interval between gap periods, and a time hopping pattern. Further, the gap configuration information may include an offset value indicating time position at which a first gap period starts and/or a gap size which is a unit time length for performing time hopping in a gap period. A time length of 1 gap size may be referred to as "slot" for convenience sake.

SFN (System Frame Number), DFN (D2D Frame number), a subframe number in the SFN or DFN, and the like of a serving cell where the user apparatus UE resides or is connected can be used as a reference time in the above-mentioned time information such as the gap period, the gap interval, the offset value, and the gap size. The point that the SFN, the DFN, the subframe number and the like can be used as a reference time for configuring measurement gaps is similarly applied to other examples in the present embodiment.

Also, all of or a part of the above-mentioned pieces of information may be predetermined values (values that the UE ascertains without receiving a notification). In a case where all of the above-mentioned pieces of information are predetermined values, the base station eNB may not notify the user apparatus UE of the gap configuration information. Alternatively, information for instructing to apply measurement gaps may be notified, as gap configuration information, from the base station eNB to the user apparatus UE.

In the example of FIG. 15, 7 slots of gap period periodically arrive with a gap interval. As shown in FIG. 15, the user apparatus UE is notified of a time hopping pattern of {1, 3, 7, 0, 6, 2, 4, 5, 0}. The time hopping pattern indicates slot numbers set as a gap for each gap period.

That is, as shown in FIG. 15, the user apparatus UE that is notified of the time hopping pattern of {1, 3, 7, 0, 6, 2, 4, 5, 0} determines slot 1 of the first number (1) of the time hopping pattern as a gap in the first gap period, and determines slot 3 of the second number (3) of the time hopping pattern as a gap in the next gap period. Same applies after that.

<Time Hopping Pattern Example 2>

Figure 16:
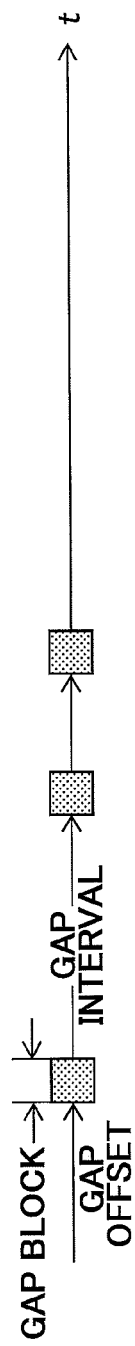
FIG. 16 is a diagram showing an example 2 of a time hopping pattern.

FIG. 16 shows a time hopping pattern example 2 as a configuration example of measurement gaps to which time hopping is applied. In this example, the gap configuration information notified from the base station eNB to the user apparatus UE includes, for example, information of a gap block, a gap interval indicating an interval between gap blocks, and a gap offset indicating a start time position of a first gap block.

The "gap block" is one described with reference to FIG. 11. Information of a gap block includes, for example, a length (time length) of the gap block, information of subframes used as measurement gaps in the block (information indicating which subframe to use as a gap), and the like.

In the example of FIG. 16, the gap interval is determined by a time hopping pattern, and a gap block arrives by being time hopped.

As to time hopping pattern, for example, similarly to the example 1, an explicit pattern similar to that of the example 1 is notified to the user apparatus UE from the base station eNB, so that the user apparatus UE switches a gap interval by sequentially referring to the number in the pattern like the example 1.

Also, instead of explicitly notifying of the explicit pattern like the example 1, a determination initial value (seed of a random number and the like) may be notified from the base station eNB to the user apparatus UE, so that the user apparatus UE may determine a time hopping pattern from the determination initial value. The method for determination is not limited to a specific method. For example, an equation for outputting a pattern such as {1, 3, 7, 0, 6, 2, 4, 5, 0} according to the determination initial value may be used. Also, a plurality of types of patterns may be held, so that a pattern corresponding to the determination initial value may be used. Also, in the example 1, a method like this using the determination initial value may be adopted.

A gap offset may be used as the determination initial value. Also, as a determination initial value, an ID (UE-ID) of the user apparatus UE may be used.

In the example shown in FIG. 16, time hopping is applied to the interval between gap blocks. Instead of that, time hopping may be applied to subframes to be used as gaps in a gap block. An example in that case is described in the following. In the following example, the gap block itself is configured using D2D resource configuration information by using the method described with reference to FIG. 3 and the like, and time hopping is applied to subframes to be used as gaps in the gap block. That is, this is an example in which D2D resource configuration information and time hopping are combined.

<Example of Combination of D2D Resource Configuration Information and Time Hopping>

A basic operation procedure in this example is the procedure as shown in FIG. 3. That is, first, the user apparatus UE receives broadcast information of another operator from a base station eNB of the other operator, so that the user apparatus UE ascertains a resource configuration of D2D communication of the other operator.

In step S101 of FIG. 3, the user apparatus UE transmits a gap configuration request to the base station eNB. The gap configuration request includes configuration information of D2D resources of the other operator obtained from the broadcast information by the user apparatus UE, for example.

Based on the gap configuration request, the base station eNB determines (configures) gap configuration information including a gap block and a time hopping pattern and the like in the block for the user apparatus UE, and returns a gap configuration response including gap configuration information to the user apparatus UE (step S102).

The user apparatus UE that receives the gap configuration response applies gap configuration information included in the gap configuration response received in step S102 to perform different frequency D2D signal monitoring in the measurement gaps. Although an example of monitoring is described here, as to operation of the user apparatus UE in the measurement gaps, operation described so far such as D2D signal transmission, priority operation of cellular UL transmission and the like can be applied.

Here, for example, in a case where D2D resource configuration information of the other operator is changed, the user apparatus UE recognizes the change based on broadcast information received from the base station eNB of the other operator, transmits a gap change request for requesting changed measurement gap configuration to the base station eNB (step S104), and receives a gap change response (changed gap configuration information) from the base station eNB (step S105). The user apparatus UE can perform monitoring of a D2D signal of the other operator using the changed measurement gaps (step S106).

After that, for example, when the user apparatus UE does not need to perform monitoring of a D2D signal of the other operator, the user apparatus UE transmits a gap release request to the base station eNB (step S107).

<Measurement Gap Example in the Combination Example>

Figure 17:
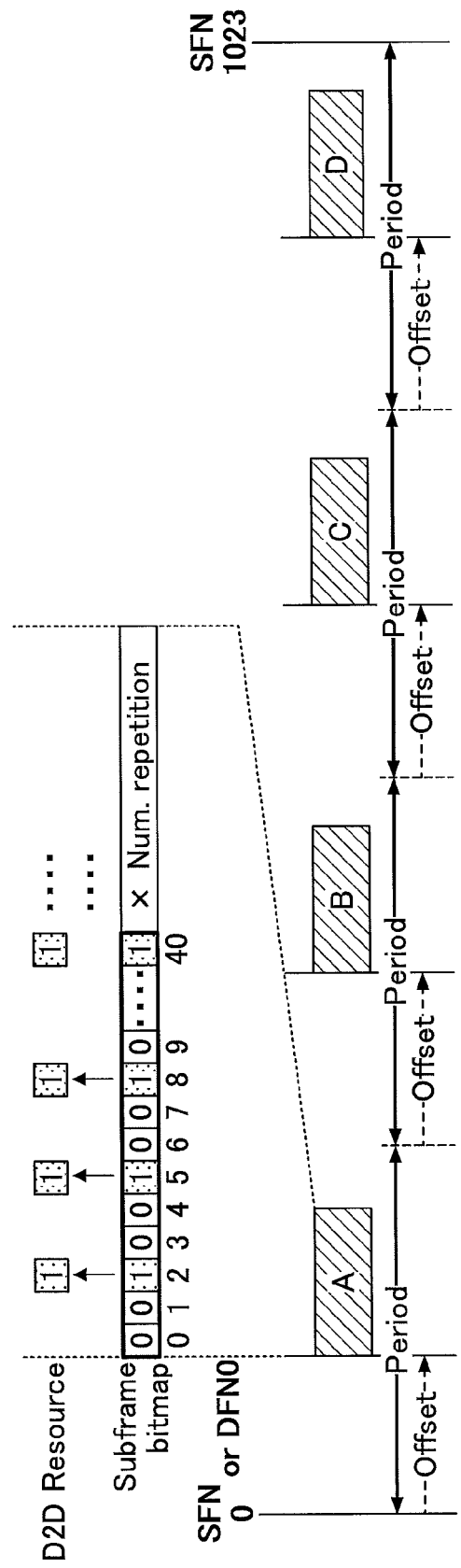
FIG. 17 is a diagram for explaining a configuration example of D2D resources.

FIG. 17 is a figure showing a configuration example of D2D resources. This is a figure focusing on a configuration of a time direction. In the example shown in FIG. 17, D2D resources are represented as a subframe bitmap. Also, the bitmap is repeated the number of times of num.reprtition. Also, an offset indicating a start position in each period is specified.

In the example of this combination, the user apparatus UE obtains a bitmap shown in FIG. 17, a period, an offset, the number of repetition and the like as D2D resource configuration information of the other operator from broadcast information, and notifies the base station eNB of it. Note that it is an example to report D2D resource configuration information of the other operator from the user apparatus UE to the base station eNB. For example, the base station eNB may obtain D2D resource configuration information of the other operator by inter-base station communication, and generate gap configuration information from the D2D resource configuration information to notify the user apparatus UE of it.

As an example, the base station eNB determines a gap block, and a time hopping pattern as shown in FIG. 8, and reports the determined content to the user apparatus UE as gap configuration information.

Figure 18:
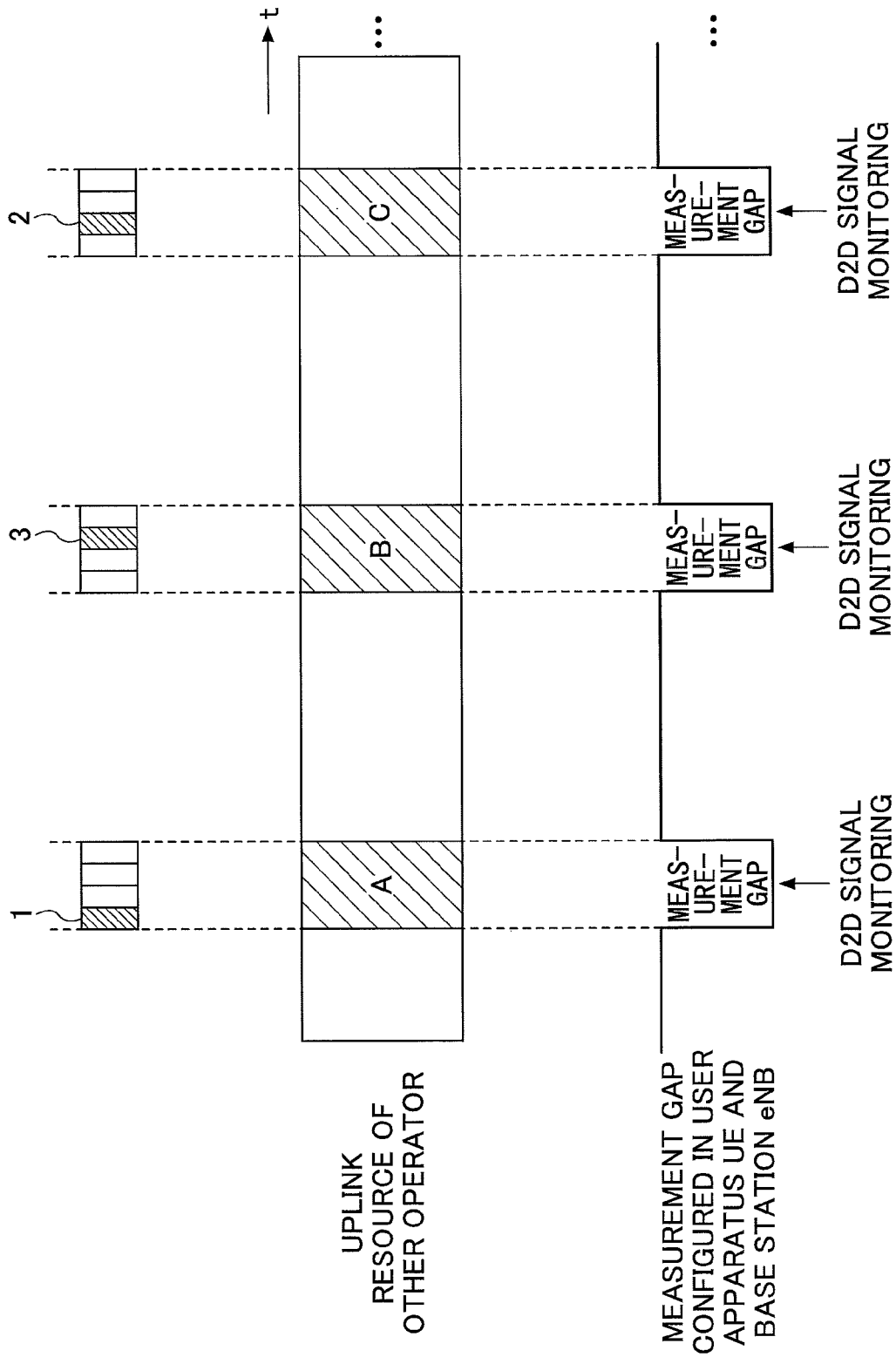
FIG. 18 is a diagram showing an example of time hopping in a modified example.

In FIG. 18, respective blocks indicated as A, B and C are gap blocks, and correspond to blocks of D2D resources indicated by A, B and C in FIG. 17. That is, in this modified example, a block in which a D2D signal may be transmitted or received is configured as a gap block. Configuration information of the gap block reported to the user apparatus UE includes a time length of a gap block, a period, an offset and the like.

In each gap block, a measurement gap is configured by the time hopping pattern without considering the actual bitmap.

That is, if the actual bitmap is considered, distribution between user apparatuses UE cannot be obtained. Thus, in this modified example, the measurement gap is configured by a time hopping pattern without considering the actual bitmap.

FIG. 18 shows a schematic example, in which, for the target user apparatus UE, a gap is set at the first subframe in a gap block A, a gap is set at the third subframe in a gap block B, and a gap is set at the second subframe in a gap block C. Note that, configuration of a time hopping pattern can be executed by notification of an actual pattern, notification of an initial value, or autonomous setting by a UE-ID or the like, like the examples described in FIG. 15 and FIG. 16, for example.

(Apparatus Configuration Example)

In the following, configuration examples of the user apparatus UE and the base station eNB that can execute operations of the embodiment of the present invention (at least all operations described so far) are described.

<Configuration Example of User Apparatus UE>

Figure 19:
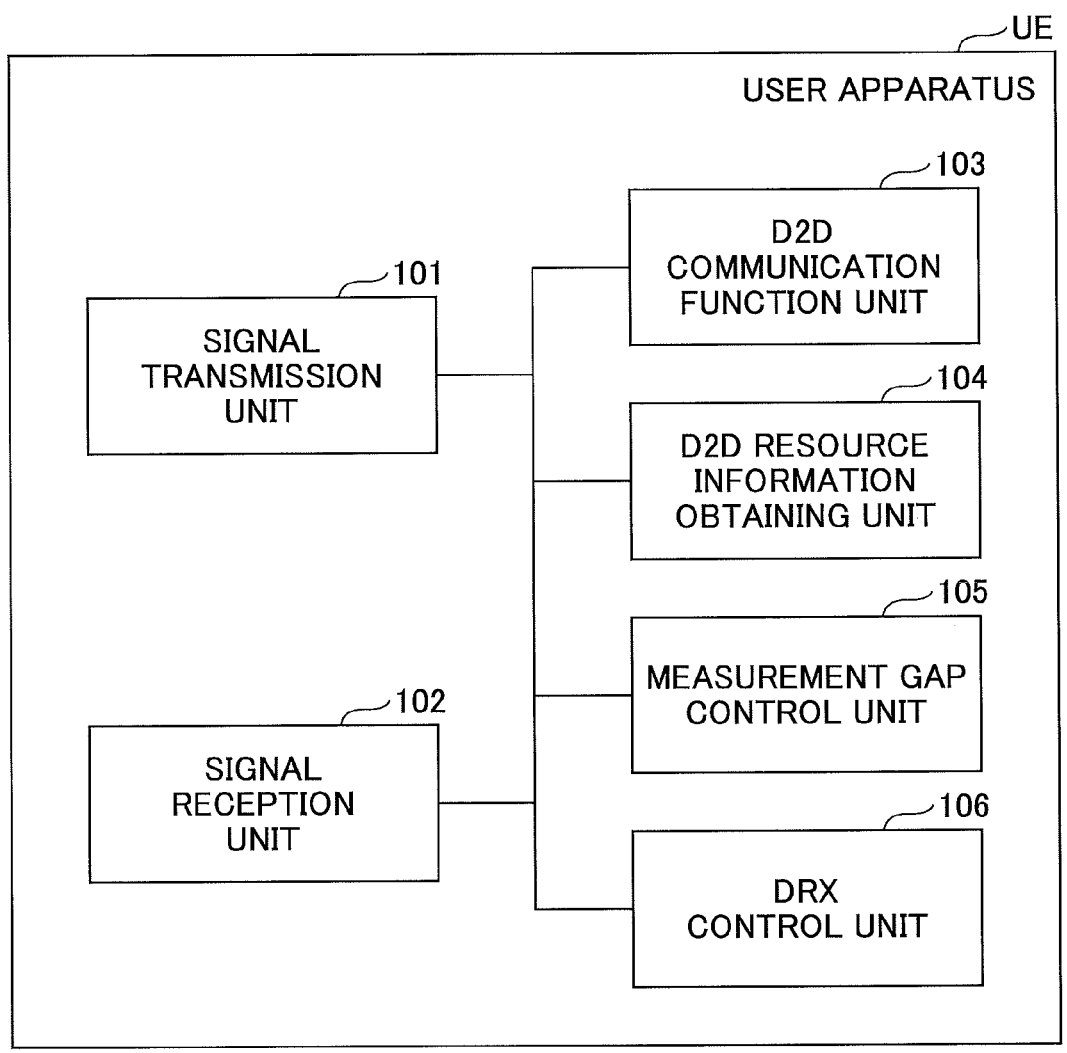
FIG. 19 is a block diagram of a user apparatus UE.

FIG. 19 shows a functional block diagram of the user apparatus UE according to the present embodiment. As shown in FIG. 19, the user apparatus UE includes a signal transmission unit 101, a signal reception unit 102, a D2D communication function unit 103, a D2D resource information obtaining unit 104, a measurement gap control unit 105 and a DRX control unit 106. FIG. 19 only shows functional units especially related to the embodiment of the present invention in the user apparatus UE, and the user apparatus UE also includes at least functions, not shown in the figure, for performing operation complying with LTE. Also, the configuration shown in FIG. 19 is merely an example. Any functional segmentations and any names of functional units can be used as long as the user apparatus UE can execute processing described in the present embodiment.

The signal transmission unit 101 includes functions configured to generate various signals of physical layer from an upper layer signal to be transmitted from the user apparatus UE, and transmit the signals by radio. The signal transmission unit 101 includes a transmission function of D2D communication and a transmission function of cellular communication.

The signal reception unit 102 includes functions configured to receive various signals from another user apparatus UE or the base station eNB by radio and obtain a signal of an upper layer from the received physical layer signals. The signal reception unit 102 includes a reception function of D2D communication and a reception function of cellular communication.

The D2D communication function unit 103 includes a function of a D2D application, and executes Discovery signal transmission and reception control, D2D data transmission and reception control and the like. Also, the D2D communication function unit 103 includes a function configured to monitor (trial of decoding and the like) a D2D signal in a measurement gap/DRX inactive section.

The D2D resource information obtaining unit 104 obtains D2D resource information from broadcast information and the like received from another operator base station and the like, and holds it in a memory and the like. Also, the D2D resource information obtaining unit 104 includes a function configured to report D2D resource information to the base station eNB.

The measurement gap control unit 105 executes processing such as request, change, configuration, release and the like of measurement gaps, and capability information notification and the like described so far. For example, the measurement gap control unit 105 generates measurement gap information (cycle, time length and the like) of a connecting or residing cell from the D2D resource information, and transmits it by including it in a gap configuration request.

Also, as described in the modified example, the measurement gap control unit 105 includes a function configured to receive gap configuration information from a base station, and to configure measurement gaps to which time hopping is applied based on the gap configuration information. To configure measurement gaps is, for example, to store the gap configuration information in a memory and the like, and to calculate a period (subframe) of a gap according to the gap configuration information to notify the signal transmission unit 101 and/or the signal reception unit 102 of the gap period (information indicating which subframe corresponds to a gap, and the like). The signal transmission unit 101 and/or the signal reception unit 102 can perform operation of, for example, performing transmission and reception of a different frequency D2D signal without performing transmission and reception of a cellular signal in a period of the measurement gap.

Also, when transmission or reception of a cellular signal is executed in a subframe other than a gap in a gap block by the signal transmission unit 101 and/or the signal reception unit 201, the measurement gap control unit 105 can also perform operation of releasing a gap in the gap block.

Also, the measurement gap control unit 105 can instruct the signal transmission unit 101 to execute, in a measurement gap, transmission of an uplink cellular signal in priority to transmission and reception of a D2D signal. Also, the measurement gap control unit 105 can perform control not to perform, in a measurement gap, transmission of a specific cellular signal from among uplink cellular signals.

Also, the measurement gap control unit 105 can perform operation described as the combination example in the modified example, that is, the measurement gap control unit 105 can transmit, to a base station of a serving cell, a gap configuration request including D2D resource configuration information, receive, from the base station, gap configuration information as a response for the gap configuration request, and configure a gap, in which D2D resource configuration information and time hopping are considered, based on the gap configuration information.

The DRX control unit 106 executes processing on transition request, change, configuration, release and the like of DRX described so far.

<Configuration Example of Base Station eNB>

Figure 20:
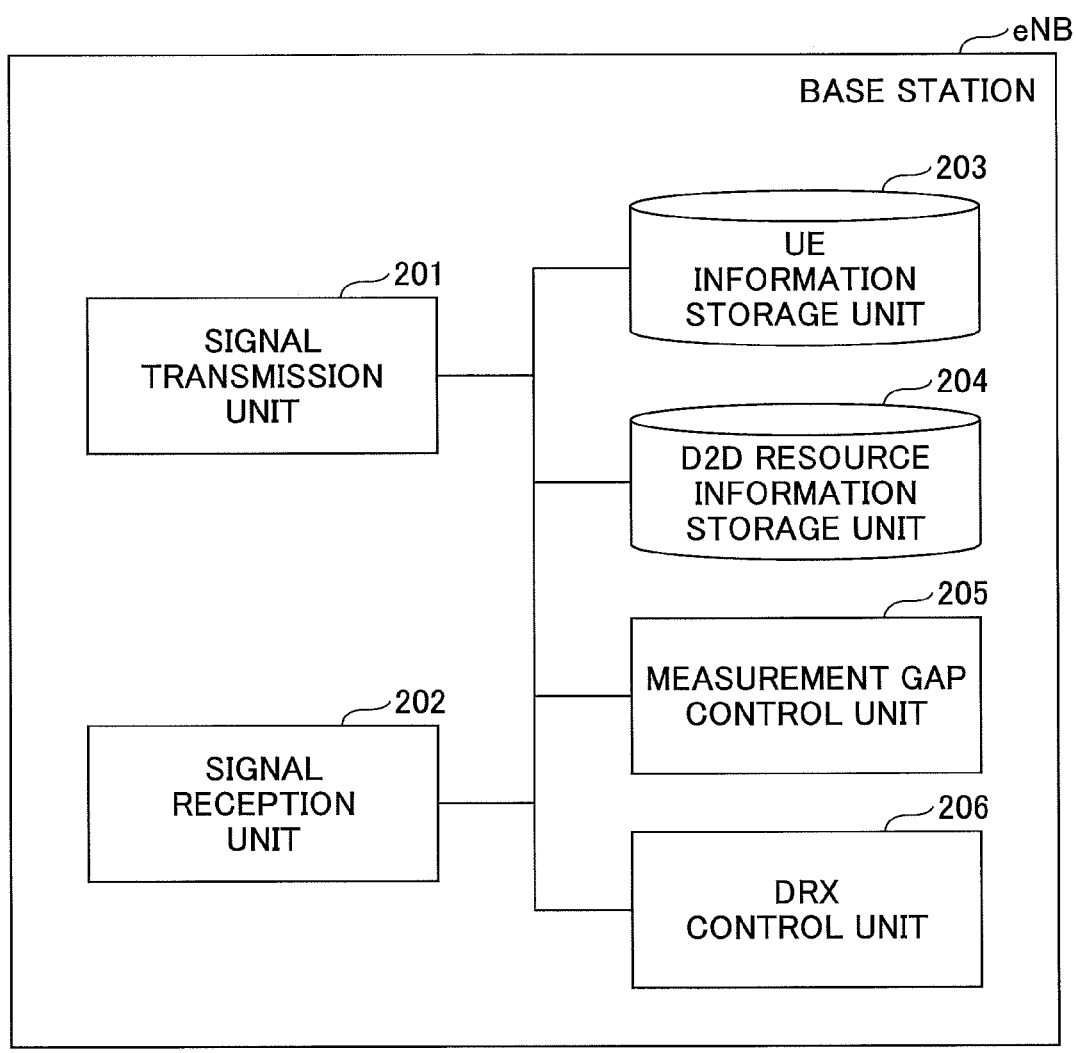
FIG. 20 is a block diagram of a base station eNB.

FIG. 20 shows a functional block diagram of the base station eNB according to the present embodiment. As shown in FIG. 20, the base station eNB includes a signal transmission unit 201, a signal reception unit 202, a UE information storage unit 203, a D2D resource information storage unit 204, a measurement gap control unit 205 and a DRX control unit 206. FIG. 20 only shows functional units especially related to the embodiment of the present invention in the base station eNB, and the base station eNB also includes at least functions, not shown in the figure, for performing operation complying with LTE. Also, the configuration shown in FIG. 20 is merely an example. Any functional segmentations and any names of functional units can be used as long as the base station eNB can execute operation described in the present embodiment.

The signal transmission unit 201 includes functions configured to generate various signals of physical layer from an upper layer signal to be transmitted from the base station eNB, and transmit the signals by radio. The signal reception unit 202 includes functions configured to receive various signals from user apparatuses UE by radio and obtain a signal of an upper layer from the received physical layer signals.

The UE information storage unit 203 stores information received from each user apparatus as UE capability, so that the measurement gap control unit 205/DRX control unit 206 can determine whether to configure measurement gap/DRX for the user apparatus UE by referring to the information.

The D2D resource information storage unit 204 stores, for example, D2D resource information (which may be processed into information for measurement gap configuration) received from each user apparatus UE, so that the measurement gap control unit 205/DRX control unit 206 can configure measurement gap/DRX even for a user apparatus UE that does not transmit a request designating a parameter by referring to this information.

The measurement gap control unit 205 executes processing on configuration, change, response to a request, release and the like of measurement gaps described so far. Also, the measurement gap control unit 205 also includes a function configured to configure a time hopping pattern and to transmit information of the configured time hopping pattern to the user apparatus UE via the signal transmission unit 201, and a function configured to transmit gap configuration information including the time hopping pattern to the user apparatus UE via the signal transmission unit 201. The DRX control unit 206 executes processing on control of transition to DRX and the like described so far.

Summary of Embodiment

In the present embodiment, there is provided a user apparatus for use in a mobile communication system that supports D2D communication, including:

measurement gap control means configured to transmit a configuration request of a measurement gap for monitoring a different frequency D2D signal to a base station of a connecting or residing cell; and D2D communication means configured to monitor the different frequency D2D signal by using the measurement gap that is configured based on the configuration request.

According to this configuration, it becomes possible that the user apparatus can efficiently perform different frequency D2D signal monitoring without inhibiting cellular communication and same frequency D2D signal transmission and reception as much as possible. Note that the different frequency D2D signal is a D2D signal that is transmitted by a frequency that is different from a frequency used for D2D signal transmission by the user apparatus.

The measurement gap control means may be configured to generate configuration information of a measurement gap based on D2D resource configuration information received from a base station that is different from the base station of the connecting or residing cell, and to transmit the configuration request including the configuration information to the base station of the connecting or residing cell. By generating configuration information of a measurement gap based on D2D resource configuration information, it becomes possible to configure measurement gaps according to a D2D resource configuration.

The measurement gap control means may be configured to transmit, to the base station of the connecting or residing cell, the configuration request including D2D resource configuration information received from a base station different from the base station of the connecting or residing cell. According to this configuration, since the base station can hold different frequency D2D resource configuration information, the base station can configure measurement gaps for any user apparatus using the configuration information, for example.

The measurement gap is configured so as to include a resource pool for transmitting the different frequency D2D signal, for example. Here, in an embodiment, "include" is not intended to mean that the measurement gap is too wide compared with a time width of a resource pool. According to this configuration, measurement gaps can be configured more efficiently.

The measurement gap control means may be configured to transmit, to the base station of the connecting or residing cell, a change request for changing configuration of the measurement gap or a release request for releasing the measurement gap. For example, by the change request, change of different frequency D2D resource configuration can be followed, and by the release request, it can be avoided to continue to set useless measurement gaps.

Also, the user apparatus may include DRX control means configured to transmit, to the base station of the connecting or residing cell, a DRX configuration request for causing the user apparatus to transit to a DRX state, and the D2D communication means may be configured to monitor the different frequency D2D signal in a non-active section in the DRX state. According to this configuration, the different frequency D2D signal can be monitored with a time length wider than a measurement gap.

The measurement gap control means may be configured to transmit, to the base station of the connecting or residing cell, capability information indicating that the user apparatus includes capability of monitoring a different frequency D2D signal or information indicating that the user apparatus desires to monitor a different frequency D2D signal. According to this configuration, for example, the base station can determine availability of measurement gap configuration for the user apparatus.

For example, the measurement gap is a predetermined subframe in a gap block having a predetermined time length, and the D2D communication means can release a measurement gap in the gap block when transmission or reception of a cellular signal in the connecting or residing cell occurs in a subframe other than a measurement gap in the gap block. According to this configuration, cellular communication can be performed efficiently while performing monitoring of a different frequency D2D signal.

The D2D communication means may be configured to perform transmission of an uplink cellular signal in the connecting or residing cell in priority to transmission and reception of a D2D signal. According to this configuration, monitoring of a different frequency D2D signal can be performed without deteriorating performance of cellular communication.

The D2D communication means may be configured not to perform, in a measurement gap, transmission of a specific cellular signal from among uplink cellular signals in the connecting or residing cell. For example, as the specific cellular signal, by selecting a signal that has little influence on performance of cellular communication, monitoring of a different frequency D2D signal can be performed efficiently without deteriorating performance of cellular communication.

The measurement gap may be a time section of a predetermined time length that is sequentially assigned based on a time hopping pattern. By applying a time hopping pattern in this way, configuration of measurement gaps can be distributed among a plurality of user apparatuses, for example.

Also, in the present embodiment, there is provided a base station for use in a mobile communication system that supports D2D communication, including:

reception means configured to receive, from a user apparatus, a configuration request of a measurement gap for monitoring a different frequency D2D signal; and measurement gap control means configured to configure a measurement gap for the user apparatus based on configuration information of the measurement gap included in the configuration request.

According to this configuration, it becomes possible that the user apparatus efficiently performs different frequency D2D signal monitoring without inhibiting cellular communication and same frequency D2D signal transmission and reception as much as possible.

The measurement gap control means may be configured to configure the measurement gap for another user apparatus that is different from the user apparatus based on configuration information of the measurement gap. According to this configuration, a proper measurement gap can be configured for a user apparatus that does not ascertain different frequency D2D resource configuration information.

Also, in the present embodiment, there is provided a different frequency D2D signal monitoring method performed by a user apparatus and a base station for use in a mobile communication system that supports D2D communication, including:

a step in which the user apparatus transmits a configuration request of a measurement gap for monitoring a different frequency D2D signal to the base station;

a step in which the base station transmits a response for the configuration request to the user apparatus; and a step in which the user apparatus monitors the different frequency D2D signal by using the measurement gap.

According to this configuration, it becomes possible that the user apparatus efficiently performs different frequency D2D signal monitoring without inhibiting cellular communication and same frequency D2D signal transmission and reception as much as possible.

The user apparatus UE described in the present embodiment may include a CPU and a memory, and may be realized by executing a program by the CPU (processor), or may be realized by hardware such as hardware circuits including logics of processing described in the embodiment, or may be configured by coexistence of a program and hardware.

The base station eNB described in the present embodiment may include a CPU and a memory, and may be realized by executing a program by the CPU (processor), or may be realized by hardware such as hardware circuits including logics of processing described in the embodiment, or may be configured by coexistence of a program and hardware.

In the above, the embodiment of the present invention has been explained. However, the disclosed invention is not limited to the embodiment. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the base station has been explained by using functional block diagrams. However, such an apparatus may be implemented in hardware, software, or a combination thereof.

Each pieces of software that operate by processors of the user apparatus and the base station according to an embodiment of the present invention may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international patent application claims priority based on Japanese patent application No. 2014-161904, filed in the JPO on Aug. 7, 2014, and Japanese patent application No. 2015-080417, filed in the JPO on Apr. 9, 2015, and the entire contents of the Japanese patent application No. 2014-161904 and the Japanese patent application No. 2015-080417 are incorporated herein by reference.

DESCRIPTION OF REFERENCE SIGNS eNB base station
UE user apparatus
101 signal transmission unit
102 signal reception unit
103 D2D communication function unit
104 D2D resource information obtaining unit
105 measurement gap control unit
106 DRX control unit
201 signal transmission unit
202 signal reception unit
203 UE information storage unit
204 D2D resource information storage unit
205 measurement gap control unit
206 DRX control unit

The invention claimed is:

1. A user apparatus for use in a mobile communication system that supports D2D communication, comprising:
a measurement gap control unit configured to transmit a configuration request of a measurement gap for monitoring a different frequency D2D signal to a base station of a connecting or residing cell; and a D2D communication unit configured to monitor the different frequency D2D signal by using the measurement gap that is configured from the base station, wherein the measurement gap control unit is configured to transmit, to the base station of the connecting or residing cell, D2D resource configuration information received from a base station different from the base station of the connecting or residing cell, wherein the user apparatus is configured to transmit the configuration request including configuration information of the measurement gap to the base station of the connecting or residing cell, wherein the configuration information of the measurement gap comprises information about a subframe bitmap of D2D resources, and wherein the measurement gap is configured so as to include a resource pool for transmitting the different frequency D2D signal.

2. The user apparatus as claimed in claim 1, wherein the measurement gap is a predetermined subframe in a gap block having a predetermined time length, and wherein the D2D communication unit is configured to release a measurement gap in the gap block when transmission or reception of a cellular signal in the connecting or residing cell occurs in a subframe other than a measurement gap in the gap block.

3. A user apparatus for use in a mobile communication system that supports D2D communication, comprising:

a measurement gap control unit configured to transmit a configuration request of a measurement gap for monitoring a different frequency D2D signal to a base station of a connecting or residing cell; and a D2D communication unit configured to monitor the different frequency D2D signal by using the measurement gap that is configured from the base station, wherein the measurement gap control unit is configured to transmit, to the base station of the connecting or residing cell, D2D resource configuration information received from a base station different from the base station of the connecting or residing cell, wherein the user apparatus is configured to transmit the configuration request including configuration information of the measurement gap to the base station of the connecting or residing cell, wherein the configuration information of the measurement gap comprises information about a subframe bitmap of D2D resources, and wherein the measurement gap control unit is configured to transmit, to the base station of the connecting or residing cell, a change request for changing configuration of the measurement gap or a release request for releasing the measurement gap.

4. A user apparatus for use in a mobile communication system that supports D2D communication, comprising:

a measurement gap control unit configured to transmit a configuration request of a measurement gap for monitoring a different frequency D2D signal to a base station of a connecting or residing cell; and a D2D communication unit configured to monitor the different frequency D2D signal by using the measurement gap that is configured from the base station, wherein the measurement gap control unit is configured to transmit, to the base station of the connecting or residing cell, D2D resource configuration information received from a base station different from the base station of the connecting or residing cell, wherein the user apparatus is configured to transmit the configuration request including configuration information of the measurement gap to the base station of the connecting or residing cell, wherein the configuration information of the measurement gap comprises information about a subframe bitmap of D2D resources, and wherein the measurement gap control unit is configured to transmit, to the base station of the connecting or residing cell, capability information indicating that the user apparatus includes capability of monitoring a different frequency D2D signal or information indicating that the user apparatus desires to monitor a different frequency D2D signal.

5. A user apparatus for use in a mobile communication system that supports D2D communication, comprising:

a measurement gap control unit configured to transmit a configuration request of a measurement gap for monitoring a different frequency D2D signal to a base station of a connecting or residing cell; and a D2D communication unit configured to monitor the different frequency D2D signal by using the measurement gap that is configured from the base station, wherein the measurement gap control unit is configured to transmit, to the base station of the connecting or residing cell, D2D resource configuration information received from a base station different from the base station of the connecting or residing cell, wherein the user apparatus is configured to transmit the configuration request including configuration information of the measurement gap to the base station of the connecting or residing cell, wherein the configuration information of the measurement gap comprises information about a subframe bitmap of D2D resources, wherein the measurement gap is a predetermined subframe in a gap block having a predetermined time length, and wherein the D2D communication unit is configured to release a measurement gap in the gap block when transmission or reception of a cellular signal in the connecting or residing cell occurs in a subframe other than a measurement gap in the gap block.

6. A base station for use in a mobile communication system that supports D2D communication, comprising:

a reception unit configured to receive, from a user apparatus, a configuration request of a measurement gap for monitoring a different frequency D2D signal; and a measurement gap control unit configured to configure a measurement gap for the user apparatus, wherein the reception unit receives D2D resource configuration information that the user apparatus received from a base station different from the base station, wherein the reception unit receives the configuration request including configuration information of the measurement gap, wherein the configuration information of the measurement gap comprises information about a subframe bitmap of D2D resources, and wherein the user apparatus is configured to transmit, to the base station, a change request for changing configuration of the measurement gap or a release request for releasing the measurement gap.

7. A different frequency D2D signal monitoring method performed by a user apparatus and a base station for use in a mobile communication system that supports D2D communication, comprising:

a transmitting step in which the user apparatus transmits a configuration request of a measurement gap for monitoring a different frequency D2D signal to the base station;

a step in which the base station transmits a configuration information of the measurement gap to the user apparatus; and a step in which the user apparatus monitors the different frequency D2D signal by using the measurement gap, wherein, in the transmitting step, the user apparatus further transmits, to the base station of the connecting or residing cell:

D2D resource configuration information received from a base station different from the base station of the connecting or residing cell, the configuration request including configuration information of the measurement gap to the base station of the connecting or residing cell, and the configuration information of the measurement gap comprises information about a subframe bitmap of D2D resources, and wherein the user apparatus is configured to transmit, to the base station of the connecting or residing cell, a change request for changing configuration of the measurement gap or a release request for releasing the measurement gap.

* * * * *